United States Patent
Rohilla

(10) Patent No.: US 10,494,908 B2
(45) Date of Patent: Dec. 3, 2019

(54) ENHANCED OIL RECOVERY METHODS

(71) Applicant: STEPAN COMPANY, Northfield, IL (US)

(72) Inventor: Neeraj Rohilla, Denver, CO (US)

(73) Assignee: STEPAN COMPANY, Northfield, IL (US)

( * ) Notice: Subject to any disclaimer, the term of this patent is extended or adjusted under 35 U.S.C. 154(b) by 0 days.

(21) Appl. No.: 16/090,312

(22) PCT Filed: Mar. 22, 2017

(86) PCT No.: PCT/US2017/023528
§ 371 (c)(1),
(2) Date: Oct. 1, 2018

(87) PCT Pub. No.: WO2017/176454
PCT Pub. Date: Oct. 12, 2017

(65) Prior Publication Data
US 2019/0112904 A1    Apr. 18, 2019

Related U.S. Application Data

(60) Provisional application No. 62/317,621, filed on Apr. 3, 2016.

(51) Int. Cl.
*E21B 43/16* (2006.01)
*E21B 43/22* (2006.01)
(Continued)

(52) U.S. Cl.
CPC .............. *E21B 43/16* (2013.01); *C09K 8/584* (2013.01); *C09K 8/588* (2013.01)

(58) Field of Classification Search
CPC .......... C09K 8/584; C09K 8/588; C09K 8/24; C09K 8/524; C09K 8/592; E21B 43/24; E21B 43/16; E21B 43/26
See application file for complete search history.

(56) References Cited

U.S. PATENT DOCUMENTS 3,508,612 A    4/1970  Reisberg et al.
3,544,613 A    12/1970 Knaggs et al.
(Continued)

OTHER PUBLICATIONS

Osterloh et al., "Surfactant-Polymer Flooding with Anionic PO/EO Surfactant Microemulsions Containing Polyethylene Glycol Additives." SPE/DOE 24151, Eighth Symposium on Enhanced Oil Recovery, Tulsa, OK (April 1992).
(Continued)

*Primary Examiner* — Zakiya W Bates
(74) *Attorney, Agent, or Firm* — Dilworth IP, LLC

(57) ABSTRACT

Methods for enhanced oil recovery. In one method, an oil-bearing sandstone formation having a clay content of at least 5 wt. % is injected with a surfactant mixture, a solution comprising 0.5 to 3 wt. % aqueous alkali, and an aqueous solution comprising a polyether. In another method, a sandstone formation having a salinity within the range of 20,000 to 100,000 ppm total dissolved solids and a divalent ion content within the range of 1,000 to 10,000 ppm is injected with a surfactant mixture and an aqueous solution comprising a polyether. In both methods, the polyether solution is injected as a sacrificial agent prior to injection of the surfactant mixture or is injected as a mitigation agent concurrently with the surfactant mixture. Surprisingly, adsorption of the surfactant mixture onto the formation can be reduced by 20-70% or more compared with similar methods performed without the aqueous alkali solution, the polyether solution, or both.

21 Claims, 12 Drawing Sheets

(51) Int. Cl.
*C09K 8/584* (2006.01)
*C09K 8/588* (2006.01)

(56) References Cited

U.S. PATENT DOCUMENTS

| | | |
|---|---|---|
| 3,890,239 A | 6/1975 | Dycus et al. |
| 4,005,749 A | 2/1977 | Birk et al. |
| 4,183,867 A | 1/1980 | Kitano et al. |
| 4,248,793 A | 2/1981 | Sekiguchi et al. |
| 4,293,428 A | 10/1981 | Gale et al. |
| 4,452,308 A | 6/1984 | Haskin et al. |
| 4,532,053 A | 7/1985 | Morita et al. |
| 4,555,351 A | 11/1985 | Morita et al. |
| 4,597,879 A | 7/1986 | Morita et al. |
| 4,608,197 A | 8/1986 | Kesling et al. |
| 4,690,217 A | 9/1987 | Taggart et al. |
| 4,703,797 A | 11/1987 | Djabbarah |
| 4,731,201 A | 3/1988 | Robbins et al. |
| 4,733,728 A | 3/1988 | Morita et al. |
| 4,765,408 A | 8/1988 | Morita et al. |
| 4,886,120 A | 12/1989 | Shupe |
| 5,009,268 A | 4/1991 | Kalfoglou |
| 5,068,043 A | 11/1991 | Thigpen et al. |
| 5,078,916 A | 1/1992 | Kok et al. |
| 5,103,909 A | 4/1992 | Morgenthaler et al. |
| 5,199,490 A | 4/1993 | Surles et al. |
| 5,284,206 A | 2/1994 | Surles et al. |
| 5,311,943 A | 5/1994 | Wellington |
| 5,654,261 A | 8/1997 | Smith |
| 5,847,183 A | 12/1998 | Schmidt et al. |
| 6,427,268 B1 | 8/2002 | Davis |
| 6,439,308 B1 | 8/2002 | Wang |
| 8,403,044 B2 | 3/2013 | Hutchison et al. |
| 8,513,168 B2 | 8/2013 | Barnes et al. |
| 8,759,261 B2 | 6/2014 | Barnes et al. |
| 2014/0073541 A1 | 3/2014 | Ravikiran et al. |

OTHER PUBLICATIONS

International Preliminary Report on Patentability issued in PCT International Application No. PCT/US2017/023528 dated Oct. 18, 2018.

ENHANCED OIL RECOVERY METHODS

FIELD OF THE INVENTION

The invention relates to enhanced oil recovery methods suitable for use with clay-rich sandstone reservoirs and clay-lean sandstone reservoirs having high salinity and high levels of divalent ions.

BACKGROUND OF THE INVENTION

Sandstone reservoirs containing significant amount of clays (30-40 wt. %) with moderate permeability (20-50 mD) provide a unique challenge to surfactant-based enhanced oil recovery (EOR) processes. A critical risk factor for these types of reservoirs is adsorption of surfactants due to greater surface area attributed to clays. Clays also have high cation exchange capacity and can release significant amounts of divalent ions that lead to increased retention of the surfactant. These factors can adversely affect the economics of a flood used for enhanced oil recovery.

In a chemical flood, surfactant cost impacts overall project economics. Most of the surfactant injected into a reservoir is lost due to adsorption on the reservoir rock surface. Sandstone reservoirs have a net negative charge at neutral pH. Therefore, anionic surfactants are preferred over non-ionic or cationic surfactants because of their lower adsorption on the sandstone reservoir rock. When a reservoir brine contains significant amounts of divalent ions (i.e., Ca and/or Mg), the use of alkali may be prohibitive and cannot be used to reduce adsorption.

Certain compositions can be mixed with a surfactant blend (as "mitigation agents") or can be injected ahead of the surfactant front (as "sacrificial agents"), or both, to satisfy the adsorption capacity of the reservoir rock and reduce surfactant adsorption by the rock. A sacrificial or mitigation agent should reduce the surfactant adsorption significantly to offset the added cost of the sacrificial agent. A sacrificial or mitigation agent should be relatively inert and should not influence crude oil/surfactant/brine interactions by causing a change in optimal salinity or interfacial tension. Known sacrificial or mitigation agents include, among others, sodium polyacrylate, glyceric acid, glycolic acid, sodium metaborate, lignin sulfonates, polyethylene glycol (PEG), and polypropylene glycol (PPG).

U.S. Pat. No. 4,005,749 describes a waterflooding process for oil recovery wherein a water-soluble polyalkylene oxide having a molecular weight of at least 1200 is used as a sacrificial agent to retard adsorption of the surfactant. Injection of the sacrificial agent is followed by an aqueous slug of a surfactant. In an alternative approach, the surfactant slug includes a polyalkylene oxide sacrificial agent. Among the reservoirs treated is a reservoir sand having a high clay content (about 18%). It is unclear from the 749 patent how addition of alkali would impact adsorption of the surfactant.

U.S. Pat. No. 4,452,308 describes a method of using a low molecular weight polyalkylene glycol as a sacrificial agent for a surfactant flooding process. The useful molecular weights taught are 200 to 1200. The references describes the "vexing" problems of surfactant loss due to adsorption onto formations and precipitation by polyvalent cations. The lower molecular weight polyethylene glycols are shown to be effective in reducing surfactant loss with bentonite clays, but not with kaolinite clays. Because the total dissolved solids content of the brines was high (94,000-96,000 TDS), the use of alkali was not considered.

DE 0090920 describes a process for recovering oil from an oil-bearing formation whereby an aqueous solution of a polyethylene glycol, a polypropylene glycol, or an EO-PO copolymer is injected before, during, or after introduction of an aqueous viscous solution of a polysaccharide, a hydroxyalkylcellulose, a hydrophilic polyacrylamide, or a hydrophilic vinyl acrylamide copolymer. The epoxide polymer is used to minimize adsorption onto the formation of the polysaccharide or other hydrophilic polymer. The impact of alkali is not discussed.

W. T. Osterloh et al., "Surfactant-Polymer Flooding with Anionic PO/EO Surfactant Microemulsions Containing Polyethylene Glycol Additives," SPE/DOE 24151, Eighth Symposium on Enhanced Oil Recovery, Tulsa, Okla. (April, 1992) 485 describes results of experiments designed to test the efficacy of polyethylene glycols in reducing the adsorption of certain surfactants onto clay. The experiments were conducted in a high-salinity brine (190,000 mg/L TDS). The authors concluded that static adsorption of certain alcohol ether sulfate surfactant blends on kaolinite could be lowered to undetectable levels using PEG-1000 as a sacrificial agent, and that PEG-1000 was generally much more effective than PEG-400 or PEG-20M in reducing static adsorption of the surfactant on kaolinite.

The industry would benefit from the availability of improved methods for enhanced oil recovery. In particular, methods that maximize surfactant utilization in clay-rich sandstone formations are needed. Ideally, the methods could utilize aqueous solutions of sacrificial or mitigation agents to avoid the added complication of solids handling. A desirable method could be used in fresh-water environments where swelling of the clay aggravates surfactant adsorption, or in high-salinity, high divalent ion environments where alkali cannot be used.

SUMMARY OF THE INVENTION

In one aspect, the invention relates to method for recovering oil from an oil-bearing sandstone formation having a clay content of at least 5 wt. %. The method comprises injecting into the formation a surfactant mixture, a solution comprising 0.5 to 3 wt. % aqueous alkali, an aqueous solution comprising a polyether, and optionally a hydrophilic polymer and then recovering oil from the formation. The polyether solution is injected as a sacrificial agent prior to injection of the surfactant mixture or is injected as a mitigation agent concurrently with the surfactant mixture. Adsorption of the surfactant mixture onto the formation is reduced by at least 20% compared with a similar method performed without the aqueous alkali solution, the polyether solution, or both.

In another aspect, the invention relates to a method for recovering oil from an oil-bearing sandstone formation having a salinity within the range of 20,000 to 100,000 ppm total dissolved solids and a divalent ion content within the range of 1,000 to 10,000 ppm. This method comprises injecting into the formation a surfactant mixture, an aqueous solution comprising a polyether, and optionally a hydrophilic polymer, and then recovering oil from the formation. The polyether solution is injected as a sacrificial agent prior to injection of the surfactant mixture or is injected as a mitigation agent concurrently with the surfactant mixture. Adsorption of the surfactant mixture onto the formation is reduced by at least 20% compared with a similar method performed without the polyether solution.

Another inventive method comprises four steps. First, an oil-bearing sandstone formation having a clay content of at least 5 wt. % is pre-flushed with a sacrificial agent comprising an aqueous solution comprising a polyether. A solution comprising aqueous alkali, a surfactant mixture, and a hydrophilic polymer are then injected into the formation. Additional hydrophilic polymer is then injected into the formation to drive oil to a production well in the formation. Finally, oil is recovered from the production well. In this method, adsorption of the surfactant mixture onto the formation is reduced by at least 20% compared with a similar method performed without the aqueous alkali solution, the polyether solution, or both.

Surprisingly, it was found that the inventive methods can improve surfactant utilization in clay-rich sandstone reservoirs and also in clay-lean sandstone reservoirs having high salinity and high levels of divalent ions. In particular, adsorption of the surfactant mixture onto the formation can be reduced by 20-70% or more compared with similar methods performed without the aqueous alkali solution, the polyether solution, or both.

DETAILED DESCRIPTION OF THE INVENTION

Figure 1:
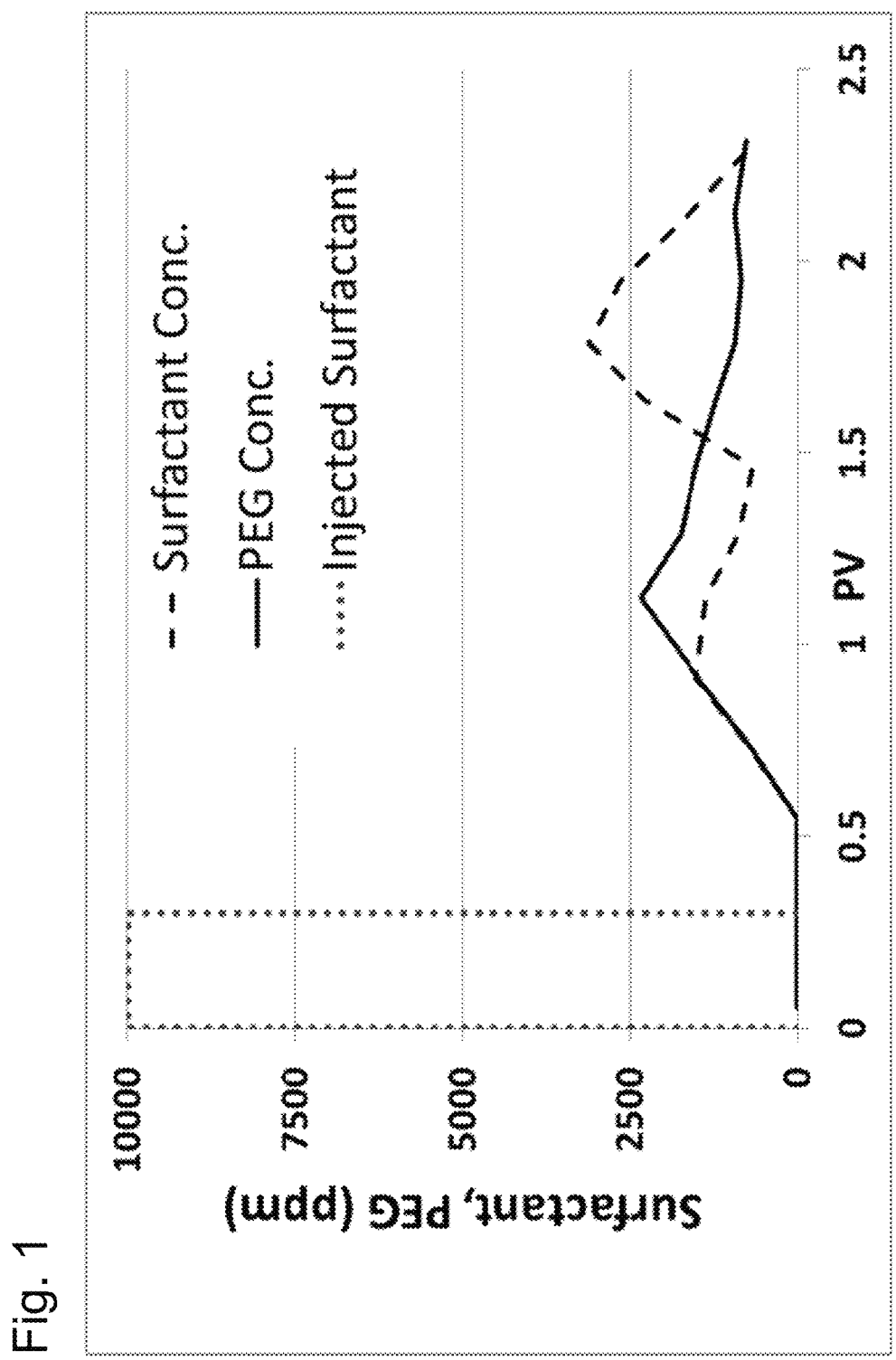
FIG. 1 plots the results of a dynamic surfactant adsorption test performed with Wyoming Field 1 sands using PEG 1500 as a sacrificial agent.

A. Oil Recovery from Formations with Clay Content at Least 5 wt. %

In one aspect, the invention relates to method for recovering oil from an oil-bearing sandstone formation having a clay content of at least 5 wt. %. The method comprises injecting into the formation a surfactant mixture, a solution comprising 0.5 to 3 wt. % aqueous alkali, an aqueous solution comprising a polyether, and optionally a hydrophilic polymer and then recovering oil from the formation. The polyether solution is injected as a sacrificial agent prior to injection of the surfactant mixture or is injected as a mitigation agent concurrently with the surfactant mixture. Adsorption of the surfactant mixture onto the formation is reduced by at least 20% compared with a similar method performed without the aqueous alkali solution, the polyether solution, or both.

1. Oil-Bearing Sandstone Formation

For this inventive aspect, the oil-bearing sandstone formation has a relatively high clay content of at least 5 wt. %. In other aspects, the clay content can be at least 10 wt. %, at least 20 wt. %, or at least 30 wt. %. In some aspects, the clay content is within the range of 5 to 60 wt. % or 10 to 50 wt. % or 20 to 40 wt. % or 30 to 40 wt. %.

The inventive method benefits and is preferably applied to formations that have at least moderate permeability, i.e., within the range of 10-100 mD or 20 to 50 mD.

The formations will have a distribution of clay types and proportions that will vary depending on formation geography, well depth, the distribution of quartz, feldspar, and other minerals present in the rock, and other factors.

The clay can be any of a wide variety of aluminosilicate clay minerals. Examples include kaolinites, illites, chlorites, smectites (e.g., montmorillonites or saponites), illite/smectites, glauconites, sepiolites, attapulgites, and the like, and combinations thereof. The proportions of the different types of clay minerals can also vary considerably depending on geography, depth, and other factors.

The formations will also have cation exchange capacities (CEC) that can vary significantly depending upon the types and proportions of clay minerals present. For instance, the CEC value of a particular formation might range from 5 to 200 meq/100 g rock or 10 to 100 meq/100 g rock or 20 to 70 meq/g rock.

The formations will have connate brines that can vary considerably in terms of their temperature, salinity (measured in total dissolved solids, TDS), and content of divalent ions (calcium or magnesium). The salinity of the connate brine will dictate whether or not alkali can be used. For this inventive aspect, the brine may have high salinity (e.g., 20,000 to 100,000 TDS), medium salinity (5,000 to 20,000 TDS) or low salinity (less than 5,000 TDS). However, unless the salinity is low, alkali cannot be used. We found, however, that the method can be used with success in fresh water environments (connate brine TDS of 1,000-3,000) when alkali is introduced. With regard to divalent ions, 1,000 to 10,000 ppm of divalent ions is considered to be a high content that can cause undesirable precipitation or retention of surfactants on the formation.

2. The Surfactant Mixture

The surfactant mixture useful herein will comprise one or more anionic surfactant components, water, and optional co-solvent and/or nonionic surfactants. The particular selection of anionic surfactant(s), their proportions, and the identity and proportion of co-solvent or nonionic surfactant are left to the skilled person's discretion, as they will depend on many factors, including the particular formation characteristics, salinity, clay content of the formation, temperature, concentration of surfactants, raw material costs, and other considerations.

Suitable anionic surfactants are well known in the art. Preferred classes of anionic surfactants useful for EOR include internal olefin sulfonates, alcohol sulfates, alcohol ether sulfates, alkyl-substituted aryl sulfonates, paraffin sulfonates, and the like, and mixtures thereof.

Suitable anionic surfactants are commercially available from Stepan Company (Petrostep products), Sasol (Alfoterra products), Shell (Enordet products), Huntsman, and other suppliers. For instance, Stepan EOR products include Petrostep® S1, Petrostep® S2, Petrostep® A6, Petrostep® S3B, Petrostep® S13C, Petrostep® S13D, and others.

In one aspect, the surfactant mixture includes an internal olefin sulfonate (e.g., Petrostep® S2), especially a $C_{11}$-$C_{15}$ internal olefin sulfonate or a $C_{20}$-$C_{24}$ internal olefin sulfonate, and an alcohol ether sulfate (e.g., Petrostep® S13), especially alcohol propoxy sulfates.

For examples of suitable anionic surfactants for use in the inventive methods, see U.S. Pat. Nos. 3,508,612; 3,544,613; 3,890,239; 4,183,867; 4,248,793; 4,293,428; 4,532,053; 4,555,351; 4,597,879; 4,608,197; 4,690,217; 4,703,797; 4,731,201; 4,733,728; 4,765,408; 4,886,120; 5,068,043; 5,078,916; 5,311,943; 5,847,183; 8,403,044; 8,513,168; and 8,759,261 and U.S. Publ. No. 2014/0073541, the teachings of which are incorporated herein by reference.

Suitable nonionic surfactants and co-solvents suitable for use in EOR applications are also well known. Suitable nonionic surfactants include, for instance, fatty alcohol alkoxylates, alkoxylated alkylphenols, alkanolamides, alkylpolyglycosides, and the like, and combinations thereof. Suitable cosolvents include, e.g., alcohols, ethers, esters, and the like. Lower alcohols, especially $C_2$-$C_5$ alcohols, are particularly preferred. Specific examples of suitable cosolvents include ethyl alcohol, n-propyl alcohol, isopropyl alcohol, isobutyl alcohol, n-butyl alcohol, sec-butyl alcohol, n-pentyl alcohol, sec-amyl alcohol, n-hexyl alcohol, n-octyl alcohol, 2-ethylhexyl alcohol, ethylene glycol n-butyl ether, diethylene glycol n-butyl ether, triethylene glycol n-butyl ether, propylene glycol methyl ether, propylene glycol methyl ether acetate, lauryl alcohol ethoxylates, glycerin, poly(glycerin), and the like, and mixtures thereof. Preferred co-solvents include low molecular weight alcohols such as isobutyl alcohol, 1-butanol, 1-pentanol, 2-ethylhexyl alcohol, and the like, and mixtures thereof.

3. The Aqueous Alkali Solution

In this inventive aspect, a solution comprising 0.5 to 3 wt. % aqueous alkali is used. A preferred range for the aqueous alkali is 1.0 to 2.75 wt. % or 1.5 to 2.5 wt. %. In some aspects, the aqueous alkali comprises an alkali metal hydroxide, an alkali metal carbonate, an alkali metal bicarbonate, an alkali metal borate, or a mixture thereof. The source of alkali can be, for instance, sodium carbonate, sodium bicarbonate, sodium hydroxide, potassium carbonate, potassium hydroxide, potassium bicarbonate, sodium metaborate, or the like, or mixtures thereof. Sodium carbonate and sodium hydroxide are generally preferred for their low cost and ready availability. In a preferred aspect, the solution comprising aqueous alkali comprises 1.5 to 2.5 wt. % of sodium carbonate or sodium hydroxide.

Preferably, the aqueous alkali solution introduced into the formation by injection concurrently with or as a part of the surfactant mixture. In preferred aspects, the aqueous solution comprising a polyether is introduced into the formation prior to injecting the surfactant mixture and aqueous alkali solution.

Although less preferred, in some aspects basic organic compounds such as amines (e.g., ethanolamine, triethanolamine) and other compounds that can raise pH or neutralize acids present in the oil can be used instead of the alkali metal compounds indicated above. Also less preferred although useful in some aspects are organic "alkali" including EDTA, iminosuccinic acid sodium salt, methylglycine diacetate, glutamic acid diacetate, aspartic acid diacetate, hydroxyethylimine diacetate and other such organic species.

We surprisingly found that, when used in a clay-rich, oil-bearing sandstone formation, alkali and the aqueous solution comprising a polyether (discussed further below) exhibit substantial synergy in reducing adsorption of the relatively expensive surfactant component. For instance, we observed reductions in surfactant adsorption in the range of 20% to more than 60% when alkali was used in combination with a polyether when compared with using polyether alone.

4. Aqueous Solution Comprising a Polyether

Polyethers suitable for use are water-soluble to at least 2000 ppm, preferably to at least 5,000 ppm, and they may be miscible with water at much higher concentrations. Suitable polyethers are epoxide polymers, usually produced from ethylene oxide, propylene oxide, or some combination thereof. In some aspects, the polyether may incorporate recurring units of other cyclic ethers, e.g., tetrahydrofuran. The polyethers generally have relatively low number average molecular weights, typically less than 5,000. Preferred polyethers include polyethylene glycols having number average molecular weights from 200 to 2,500, polypropylene glycols having number average molecular weights from 200 to 1,000, block copolymers of ethylene oxide and propylene oxide having number average molecular weights from 200 to 2,500, and random copolymers of ethylene oxide and propylene oxide having number average molecular weights from 200 to 2,500.

In some aspects, the polyether is used as sacrificial agent. In this case, the aqueous solution comprising a polyether is introduced or injected into the formation prior to the surfactant mixture. The aqueous solution comprising a polyether can also be used as a mitigation agent. In this case, the polyether is introduced or injected into the formation concurrently with the surfactant mixture. It is also possible to use the polyether as both a sacrificial agent and as a mitigation agent in the same campaign.

5. Optional Hydrophilic Polymer

In preferred aspects, a hydrophilic polymer is included in the process. The hydrophilic polymer is used to help drive the less-viscous oil to the production well in an SP or ASP process. Suitable hydrophilic polymers are well known in the art and include, for example, polyacrylamides, partially hydrolyzed polyacrylamides having Mw values of 1 to 30 million (e.g., Flopaam™ 3330S and Flopaam™ 3630S, products of SNF, or Kypaam™ 5, product of Beijing Hengju), copolymers of acrylamide with aminopropylsulfonic acid or N-vinyl-2-pyrrolidone, polyacrylates, ethylenic copolymers, biopolymers, carboxymethylcellulose, polyvinyl alcohols, polystyrene sulfonates, polyvinylpyrrolidones, 2-acrylamide-2-methylpropane sulfonates, or combinations thereof. Suitable ethylenic copolymers include, e.g., copolymers of acrylic acid and acrylamide, acrylic acid and lauryl acrylate, and lauryl acrylate and acrylamide. Suitable biopolymers include, e.g., xanthan gum, guar gum, scleroglucan, diutan, and the like. Weight average molecular weights (Mw) of the polymers preferably range from 10,000 to 30 million. Polymers are typically used at concentrations from 50 to 5000 ppm, preferably from 100 to 2000 ppm, to match or exceed the reservoir oil viscosity under the reservoir conditions of temperature and pressure. It may be desirable to crosslink the polymer in situ in a hydrocarbon-containing formation. Moreover, the polymer can be generated in situ in a hydrocarbon-containing formation. Partially hydrolyzed polyacrylamides are particularly preferred.

Hydrophilic polymers and polymer preparations for use in oil recovery are described in U.S. Pat. Nos. 6,427,268, 6,439,308, 5,654,261, 5,284,206, 5,199,490 and 5,103,909, the teachings of which are incorporated herein by reference.

In some aspects, adsorption of the surfactant mixture onto the formation is reduced by at least 20% compared with a similar method performed without the aqueous alkali solution. In other aspects, adsorption of the surfactant mixture onto the formation is reduced by at least 30% compared with a similar method performed without the aqueous alkali solution, the polyether solution, or both. In still other aspects, adsorption of the surfactant mixture onto the formation is reduced by at least 50% compared with a similar method performed without the aqueous alkali solution, the polyether solution, or both.

B. Oil Recovery from Formations with High Salinity and High Divalent Ion Content In another aspect, the invention relates to a method for recovering oil from an oil-bearing sandstone formation having a salinity within the range of 20,000 to 100,000 ppm total dissolved solids and a divalent ion content within the range of 1,000 to 10,000 ppm. This method comprises injecting into the formation a surfactant mixture, an aqueous solution comprising a polyether, and optionally a hydrophilic polymer, and then recovering oil from the formation. The polyether solution is injected as a sacrificial agent prior to injection of the surfactant mixture or is injected as a mitigation agent concurrently with the surfactant mixture. Adsorption of the surfactant mixture onto the formation is reduced by at least 20% compared with a similar method performed without the polyether solution.

1. Sandstone Formation

For this inventive aspect, the oil-bearing sandstone formation can have a wide range of clay contents, from clay-lean (less than 5 wt. %) to the clay-rich contents described earlier (10 to 40 wt. %). Except as further described below, the sandstone formations have the characteristics described previously.

In this inventive aspect, the formations will have connate brines that have high salinity and a high content of divalent ions. The high salinity of the connate brine prevents alkali from being useful in this aspect. In general, the brine will have a salinity within the range of 20,000 to 100,000 TDS, or 25,000 to 50,000 TDS and a divalent ion content of 1,000 to 10,000 ppm, or 1,500 to 5,000 ppm.

2. The Surfactant Mixture

Suitable surfactant mixtures for use in this inventive aspect have already been described above.

3. Aqueous Solution Comprising a Polyether

Suitable polyethers for use in this inventive aspect have already been described above. As was the case earlier, the aqueous solution comprising a polyether can be used as a sacrificial agent, as a mitigation agent, or both.

We surprisingly found that adsorption of the surfactant mixture onto the formation according to this inventive aspect is reduced by at least 20% compared with a similar method performed without the polyether solution.

4. Optional Hydrophilic Polymer

Suitable hydrophilic polymers for use in this inventive aspect have already been described above.

C. Oil Recovery Method

Another inventive method comprises four steps. First, an oil-bearing sandstone formation having a clay content of at least 5 wt. % is pre-flushed with a sacrificial agent comprising an aqueous solution comprising a polyether. A solution comprising aqueous alkali, a surfactant mixture, and a hydrophilic polymer are then injected into the formation. Additional hydrophilic polymer is then injected into the formation to drive oil to a production well in the formation. Finally, oil is recovered from the production well. In this method, adsorption of the surfactant mixture onto the formation is reduced by at least 20% compared with a similar method performed without the aqueous alkali solution, the polyether solution, or both.

The following examples merely illustrate the invention; those skilled in the art will recognize many variations that are within the spirit of the invention and scope of the claims.

Experiments:

To design a robust surfactant formulation that recovers significant amounts of residual oil post waterflood, the capillary number needs to be increased by at least three orders of magnitude. Lowering the interfacial tension (IFT) between aqueous and oil phase to an ultra-low value ($10^{-3}$ dynes/cm or lower) is critical in mobilizing trapped residual oil in the reservoir. Many experiments are needed to find a suitable surfactant formulation for a given reservoir.

First, surfactant phase behavior tests involving either salinity scans or surfactant scans are conducted as a high-throughput screening tool to select one or many blends of surfactant which can achieve ultra-low IFT values. Then, a robustness study is performed to determine the range of salinity and the surfactant concentrations over which the formulation maintains ultra-low IFT values. The formulation should be robust enough that any change of +/−5% in any component does not alter the interfacial interactions significantly.

Second, static and dynamic adsorption tests are performed to measure the surfactant adsorption capacity of the rock to ensure that enough surfactant is used in coreflood experiments to offset the loss of surfactant to the rock surface.

Finally, a series of coreflood experiments is performed to characterize the effectiveness of developed surfactant formulation in displacing residual oil under reservoir conditions. Once confidence in the formulation is established, a single well chemical tracer test (SWCTT) is performed in the field. The following sections describe in details the results of these tests.

Surfactant Mixture:

A sample of surfactant mixture is formulated by combining Petrostep® S-13D (an ether sulfate surfactant made by propoxylating tridecanol with an average of 13 equivalents of PO, followed by sulfation and neutralization, product of Stepan Company, 18.84 g) with Petrostep® S-3B (a $C_{20}$-$C_{24}$ internal olefin sulfonate, product of Stepan, 16.1 g), isobutyl alcohol (3.77 g), and deionized water (15.72 g).

Brine Compositions:

Surfactant mixture made as described above is combined with NaCl, $Na_2CO_3$, polyethylene glycol (PEG 400, PEG 1000, or PEG 1500), and deionized water in amounts needed to give the brine compositions identified in Tables 2 and 4-9.

Salinity Scans

Salinity scans are the most common batch experiments to find the optimum surfactant formulation exhibiting type III microemulsion behavior at the desired salinity. In a salinity scan experiment, typically surfactant/co-solvent concentrations and the water oil ratio (WOR) are kept constant while the salinity is increased systematically for a set of phase tubes. Increases in salinity causes the classical Winsor surfactant phase behavior transitions from Type I (oil in water microemulsion) to Type III (bi-continuous middle phase microemulsion) to Type II (water in oil) microemulsions. The surfactant formulation for this project consists of a mixture of two surfactants and a co-solvent. One of the surfactants is an alcohol propoxy sulfate (APS) while the other is an internal olefin sulfonate (IOS). Isobutanol (IBA) is the co-solvent component of the formulation. The formulation consists of 1 wt. % total surfactant and 1 wt. % co-solvent. In one series of experiments, the scanned salinity range is 1.5 to 3.5 wt. % NaCl in increments of 0.2 wt. %. In a second series, the scanned salinity range is 0.1 to 1.0 wt. % NaCl in increments of 0.1 wt. %. For both cases, a middle phase consisting of type III microemulsion is observed. The solubilization ratio at optimal salinity is about 25-30. Such high solubilization ratios suggest ultra-low IFT based on a Chun-Huh correlation.

The crude oil is not reactive with alkali as exhibited by low total acid number of the crude oil. However, alkali (sodium carbonate) is used to reduce the adsorption of surfactant on the rock surface under high pH conditions. Other phase behavior tests are conducted to compute the activity diagram which show optimal salinity as a function of the surfactant concentration and the water/oil ratio (WOR). One formulation has an optimal salinity of 1.75 wt. % $Na_2CO_3$+0.5 wt. % NaCl at a WOR of 1. The optimal salinity is 1.75 wt. % $Na_2CO_3$+0.9 wt. % NaCl at WOR of 3. Typically, the residual oil saturation (Sor) in mature sandstone reservoirs is about ⅓. Hence, for this study salinity of the injected ASP slug during corefloods was same as the optimal salinity at WOR of 3.

IFT values for ASP formulations having 0.5 wt. % and 1.0 wt. % total surfactant are measured using a spinning drop tensiometer. The current formulation yields ultra-low IFT ($10^{-3}$ dynes/cm or lower) over a 5,000 ppm range of salinity. The measured IFT values (dynes/cm) are shown in the table below:

| $Na_2CO_3$ (wt. %) | NaCl (wt. %) | IFT (dynes/cm), 1.0 wt. % total surfactant | IFT (dynes/cm), 0.5 wt. % total surfactant |
|---|---|---|---|
| 1.75 | 0.5 | 0.0013 | 0.0003 |
| 1.75 | 0.6 | 0.0022 | 0.0002 |
| 1.75 | 0.7 | 0.0015 | 0.0012 |
| 1.75 | 0.8 | 0.0004 | 0.0012 |

The viscosity of type III microemulsion can have a significant effect on the transport of generated oil bank in porous media during a coreflood. The viscosity of the type III microemulsion phase was measured using a falling sphere viscometer. For the selected formulation, the viscosity of the type III microemulsion phases is in the range of 6-11 cP.

Surfactant Adsorption Tests

Surfactant is the most expensive component of an ASP formulation. An ASP process is designed and optimized with the consideration that a significant portion of the injected surfactant is lost onto the reservoir rock surface. This is deliberately done such that the produced oil bank is not emulsified at the producer well thereby requiring little or no emulsion breaking treatment. Hence, an accurate characterization of the adsorption capacity of the reservoir rock is necessary to design the appropriate ASP slug size and the concentration of the surfactant in the ASP slug.

An adsorption test measures the loss of surfactant onto the crushed reservoir rock. When the test is carried out by contacting surfactant solution with crushed reservoir rock under static conditions (no flow), the test is called a "static adsorption test." A similar test conducted under flow conditions through a core is called a "dynamic adsorption test." To estimate the surfactant adsorption, either static or dynamic adsorption tests are conducted.

In the static adsorption test, surfactant adsorption can be estimated with batch adsorption experiments. In these experiments, a surfactant solution of known concentration is contacted with a known mass of crushed core materials. Crushed core material between 35-100 mesh sizes (150-500 micron particle size) is used for the current study. The concentration of the equilibrated surfactant solution is measured and the adsorption is computed by a material balance of surfactant using Equation 1:

$$Ad\left(\frac{mg}{g\ rock}\right) = \frac{(W_{Surf\ Solution} * 10 * (C_i - C_f))}{W_{Rock}} \quad \text{Equation 1}$$

Where:
$C_i$ = Initial solution concentration (wt %)
$C_f$ = Final solution concentration (wt %)
$W_{Surf\ solution}$ = Weight of the surfactant solution in contact with the rock (g)
$W_{Rock}$ = Weight of the crushed rock in contact with surfactant solution (g)

Surfactant adsorption is calculated for two different samples of the reservoir rock (sample 1 and 2). Sample 1 contains on average of 19 wt. % of clays while sample 2 contains 43 wt. % of clays. The relative clay percentages for Sample 1 are: kaolinite (47%), illite (11%), chlorite (30%), and illite/smectite (12%) and for Sample 2 are: kaolinite (68%), illite (7%), chlorite (<1%), and illite/smectite (25%).

TABLE 1

| Formulations Used | |
|---|---|
| Field | Formulation Recipe |
| Wyoming Field 1 | 55% Petrostep ® S13D and 45% Petrostep ® S3B |
| Illinois Basin | 62.5% Petrostep ® S13D, 25.5% Petrostep ® S2 and 12% Polystep ® B27 |

Wyoming Field 1 Formulation. Various Sands with and without Alkali:

TABLE 2

| Baseline of Adsorption for Wyoming Field 1, Rock # 1 | | | | | |
|---|---|---|---|---|---|
| S. No. | Brine composition | Co (initial) (ppm) | C* (final) (ppm) | Adsorption (mg/g) | pH (Initial) | pH (final) |
| 1 | 2.25% NaCl | 2,500 | 1,335 | 2.3 | 9.8 | 7.0 |
| 2 | 1.75% $Na_2CO_3$ + 0.5% NaCl | 2,500 | 1,511 | 1.9 | 11.7 | 11.2 |
| 3 | 2.25% NaCl | 1,500 | 267 | 2.5 | 9.7 | 7.1 |
| 4 | 1.75% $Na_2CO_3$ + 0.5% NaCl | 1,500 | 591 | 1.8 | 11.6 | 11.3 |
| 5 | 2.25% NaCl | 1,000 | 118 | 1.8 | 7.3 | 7.0 |
| 6 | 1.75% $Na_2CO_3$ + 0.5% NaCl | 1,000 | 172 | 1.6 | 11.6 | 11.3 |

Co is the initial concentration of surfactant in solution (ppm); C* is the final concentration of surfactant in solution after exposure to the sand.
Adsorption refers to the amount of surfactant adsorbed by the sand in mg surfactant per g of rock.

Table 2 lists the results of static adsorption tests performed for the surfactant formulation with rock Sample #1. In the absence of alkali, the surfactant adsorption is quite high (2.3 mg/g for Sample #1). Alkali only marginally reduces the adsorption and is not an effective adsorption mitigator for the current reservoir rock. The reservoir rock contains significant amounts of reactive clays which result in a significant change in pH of the surfactant solutions when contacting the rock. For an alkali-surfactant-polymer (ASP) process to be economical, the surfactant adsorption should be small (less than 0.5 mg/g rock). Adsorption results shown in Table 2 suggest the need for a sacrificial agent (e.g., an aqueous solution comprising a polyether) that can reduce the adsorption significantly in the presence of alkali.

To screen sacrificial agents to be used for a reservoir containing significant amount of clays, kaolin powder is used as a model substrate for adsorption studies. Three different sacrificial agents (PEG 400, PEG 1000, and PEG 1500) are identified based on preliminary testing. The concentration of the sacrificial agent is the same as the total surfactant concentration. Table 3 shows the results of static adsorption tests performed for surfactant formulation with 100% kaolin powder. In the absence of any sacrificial agent, the surfactant adsorption is calculated to be 11.9 mg/g rock. PEG 1500 is found to be most effective, reducing surfactant adsorption by a factor of two on kaolin powder.

TABLE 3

Effect of PEG Molecular Weight on Adsorption of Surfactant on Kaolin Powder

| S. No. | Sand Type | Sacrificial Agent | Adsorption (mg/g) |
|---|---|---|---|
| 1 | 100% Kaolin | None | 11.9 |
| 2 | | PEG 400 | 10.9 |
| 3 | | PEG 1000 | 8.2 |
| 4 | | PEG 1500 | 5.6 |

Table 4 shows the results from a series of static adsorption tests to evaluate PEG 1000 or PEG 1500 as the sacrificial agent with crushed Wyoming Field 1 sand (35-100 mesh). Use of alkali reduces the surfactant adsorption from 2.2 to 1.75 mg/g rock. Using the sacrificial agent alone in the absence of alkali reduces the surfactant adsorption from 2.2 to 1.31 mg/g rock (PEG 1000) or 1.08 mg/g rock (PEG 1500). However, using the PEG 1500 in the presence of alkali further reduces the adsorption to 0.41 mg/g rock, demonstrating synergy between alkali and the sacrificial agent; surfactant adsorbance is reduced a remarkable 62% when including alkali with PEG 1500 compared with PEG 1500 alone.

TABLE 4

Effect of PEG on Adsorption of Surfactant on Crushed Wyoming Field 1 Sand (With and Without Alkali)

| S. No. | Brine composition | Adsorption (mg/g) |
|---|---|---|
| 1 | 2.25% NaCl | 2.2 |
| 2 | 1.75% Na$_2$CO$_3$ + 0.5% NaCl | 1.75 |
| 3 | 2.25% NaCl + PEG 400 | 1.82 |
| 4 | 2.25% NaCl + PEG 1000 | 1.31 |
| 5 | 2.25% NaCl + PEG 1500 | 1.08 |
| 6 | 1.75% Na$_2$CO$_3$ + 0.5% NaCl + PEG 1500 | 0.41 |

A series of static adsorption tests is also performed to evaluate PEG 1500 as the sacrificial agent with crushed Berea rock (35-100 mesh). The results are shown in Table 5. Use of alkali reduces the surfactant adsorption from 0.56 to 0.25 mg/g rock. Using the sacrificial agent alone in the absence of alkali reduces the surfactant adsorption from 0.56 to 0.14 mg/g rock. However, using the sacrificial agent in the presence of alkali further reduces the adsorption to 0.1 mg/g rock, again demonstrating synergy between alkali and the sacrificial agent; surfactant adsorbance is reduced by 29% when including alkali with PEG 1500 compared with PEG 1500 alone.

TABLE 5

Effect of PEG on Adsorption of Surfactant on Crushed Berea Sand (With and Without Alkali)

| S. No. | Sand Type | Brine Composition | Sacrificial Agent | Adsorption (mg/g) |
|---|---|---|---|---|
| 1 | Crushed Berea Sandstone | 2.25% NaCl | None | 0.56 |
| 2 | | 1.75% Na$_2$CO$_3$ + 0.5% NaCl | None | 0.25 |
| 3 | | 2.25% NaCl + PEG 1500 | PEG 1500 | 0.14 |
| 4 | | 1.75% Na$_2$CO$_3$ + 0.5% NaCl + PEG 1500 | PEG 1500 | 0.10 |

Table 6 shows the results from static adsorption tests to evaluate PEG 1500 as the sacrificial agent with crushed North Sea sand. Use of alkali reduces the surfactant adsorption from 37.55 to 10.90 mg/g rock. Using the sacrificial agent alone in the absence of alkali reduces the surfactant adsorption from 37.55 to 12.94 mg/g rock. However, using the sacrificial agent in the presence of alkali further reduces the adsorption to 7.48 mg/g rock, again demonstrating synergy between alkali and the sacrificial agent; surfactant adsorbance is reduced by 42% when including alkali with PEG 1500 compared with PEG alone.

TABLE 6

Effect of PEG on Adsorption of Surfactant on Crushed North Sea Sand (With and Without Alkali)

| S. No. | Sand Type | Brine Composition | Sacrificial Agent | Surf. Ads (mg/g) |
|---|---|---|---|---|
| 1 | North Sea Sand (Glauconite Rich Sand) | 2.25% NaCl | None | 37.55 |
| 2 | | 1.75% Na$_2$CO$_3$ + 0.5% NaCl | None | 10.90 |
| 3 | | 2.25% NaCl + PEG 1500 | PEG 1500 | 12.94 |
| 4 | | 1.75% Na$_2$CO$_3$ + 0.5% NaCl + PEG 1500 | PEG 1500 | 7.48 |

Initial concentration (Co) of surfactant = 3500 ppm.

Table 7 shows the results from static adsorption tests to evaluate PEG 1500 as the sacrificial agent with crushed Wyoming Field 2 sand. Use of alkali reduces the surfactant adsorption from 2.33 to 0.96 mg/g rock. Using the sacrificial agent alone in the absence of alkali reduces the surfactant adsorption from 2.23 to 1.14 mg/g rock. However, using the sacrificial agent in the presence of alkali further reduces the adsorption to 0.51 mg/g rock, again demonstrating synergy between alkali and the sacrificial agent; surfactant adsorbance is reduced by 55% when including alkali with PEG 1500 compared with PEG alone.

TABLE 7

Effect of PEG on Adsorotion of Surfactant on Crushed Wyoming Field 2 Sand (With and Without Alkali)

| S. No. | Sand Type | Brine Composition | Sacrificial Agent | Surf. Ads (mg/g) |
|---|---|---|---|---|
| 1 | Wyoming Field 2 Sand | 2.25% NaCl | None | 2.33 |
| 2 | | 1.75% Na$_2$CO$_3$ + 0.5% NaCl | None | 0.96 |

TABLE 7-continued

Effect of PEG on Adsorption of Surfactant on Crushed
Wyoming Field 2 Sand (With and Without Alkali)

| S. No. | Sand Type | Brine Composition | Sacrificial Agent | Surf. Ads (mg/g) |
|---|---|---|---|---|
| 3 | | 2.25% NaCl + PEG 1500 | PEG 1500 | 1.14 |
| 4 | | 1.75% Na$_2$CO$_3$ + 0.5% NaCl + PEG 1500 | PEG 1500 | 0.51 |

Initial concentration (Co) of surfactant = 2000 ppm.

Table 8 shows the results from static adsorption tests to evaluate PEG 1500 as the sacrificial agent with crushed Latin America Field sand. Use of alkali reduces the surfactant adsorption from 5.61 to 2.36 mg/g rock. Using the sacrificial agent alone in the absence of alkali reduces the surfactant adsorption from 5.61 to 3.75 mg/g rock. However, using the sacrificial agent in the presence of alkali further reduces the adsorption to 1.95 mg/g rock, again demonstrating synergy between alkali and the sacrificial agent; surfactant adsorbance is reduced by 48% when including alkali with PEG 1500 compared with PEG alone.

TABLE 8

Effect of PEG Adsorption of Surfactant on Crushed
Latin America Field Sand (With and Without Alkali)

| S. No. | Sand Type | Brine Composition | Sacrificial Agent | Surf. Ads (mg/g) |
|---|---|---|---|---|
| 1 | Latin America Field Sand | 2.25% NaCl | None | 5.61 |
| 2 | | 1.75% Na$_2$CO$_3$ + 0.5% NaCl | None | 2.36 |
| 3 | | 2.25% NaCl + PEG 1500 | PEG 1500 | 3.75 |
| 4 | | 1.75% Na$_2$CO$_3$ + 0.5% NaCl + PEG 1500 | PEG 1500 | 1.95 |

Initial concentration (Co) of surfactant = 2000 ppm.

Table 9 shows the results from static adsorption tests to evaluate PEG 1500 as the sacrificial agent with crushed Wyoming Field 1, Sand #2 (muddy, clay-rich) sand. Use of alkali reduces the surfactant adsorption from 9.49 to 5.44 mg/g rock. Using the sacrificial agent alone in the absence of alkali reduces the surfactant adsorption from 9.49 to 5.12 mg/g rock. However, using the sacrificial agent in the presence of alkali further reduces the adsorption to 1.81 mg/g rock, again demonstrating synergy between alkali and the sacrificial agent; surfactant adsorbance is reduced by 65% when including alkali with PEG 1500 compared with PEG alone.

TABLE 9

Effect of PEG Adsorption of Surfactant on Crushed Wyoming Field
1, Sand #2 (Muddy, Clay-Rich) Sand (With and Without Alkali)

| S. No. | Sand Type | Brine Composition | Sacrificial Agent | Surf. Ads (mg/g) |
|---|---|---|---|---|
| 1 | Wyoming Field 1, Sand # 2 | 2.25% NaCl | None | 9.49 |
| 2 | | 1.75% Na$_2$CO$_3$ + 0.5% NaCl | None | 5.44 |
| 3 | | 2.25% NaCl + PEG 1500 | PEG 1500 | 5.12 |
| 4 | | 1.75% Na$_2$CO$_3$ + 0.5% NaCl + PEG 1500 | PEG 1500 | 1.81 |

Initial concentration (Co) of surfactant = 2000 ppm.

Dynamic Adsorption Test with Wyoming Field 1 Formulation

FIG. 1 plots the results of a dynamic surfactant adsorption test performed with Wyoming Field 1 sands using PEG 1500 as a sacrificial agent. The figure shows the surfactant and the sacrificial agent concentrations measured from effluent samples. Breakthrough of both surfactant and sacrificial agent take place at close to 1 PV. The first peak in the surfactant concentration is the true breakthrough curve for the surfactant. The second peak can be attributed to the desorbed surfactant during low salinity chase water drive. The maximum surfactant concentration from the breakthrough curve is measured at 1,500 ppm. The maximum sacrificial agent concentration is measured to be about 2,500 ppm. This suggests that enough surfactant and sacrificial agent were injected. The pore volume of the ASP slug and the concentrations of the surfactant and the sacrificial agent in the ASP slug have not been optimized.

Illinois Basin Formulation:

When the formation has high salinity (20,000 to 100,000 ppm total dissolved solids and a divalent ion content within the range of 1,000 to 3,000 ppm), an ASP process is unworkable, so an SP process is used. Thus, sacrificial agent is employed without addition of alkali.

Table 10 shows the results from static adsorption tests to evaluate PEG 400, PEG 1000, and 1500 as the sacrificial agent with crushed Illinois Basin sand and produced brine having 42,000 ppm TDS. As shown in Table 10, PEG having a higher molecular weight (1000-1500) is generally more effective in preventing surfactant adsorption onto crushed Illinois Basin sand at high brine strength.

TABLE 10

Effect of PEG Molecular Weight on Adsorption of Surfactant
on Crushed Illinois Basin Sand (70% brine strength)

| S. No. | Sand Type | Brine composition | Sacrificial Agent | Adsorption (mg/g) |
|---|---|---|---|---|
| 1 | Crushed Illinois Basin rock | 70% produced brine (42,000 ppm) | None | 1.2 |
| 2 | | | PEG 400 | 0.88 |
| 3 | | | PEG 1000 | 0.45 |
| 4 | | | PEG 1500 | 0.39 |

Dynamic Adsorption Tests with Illinois Basin Formulation

Figure 2:
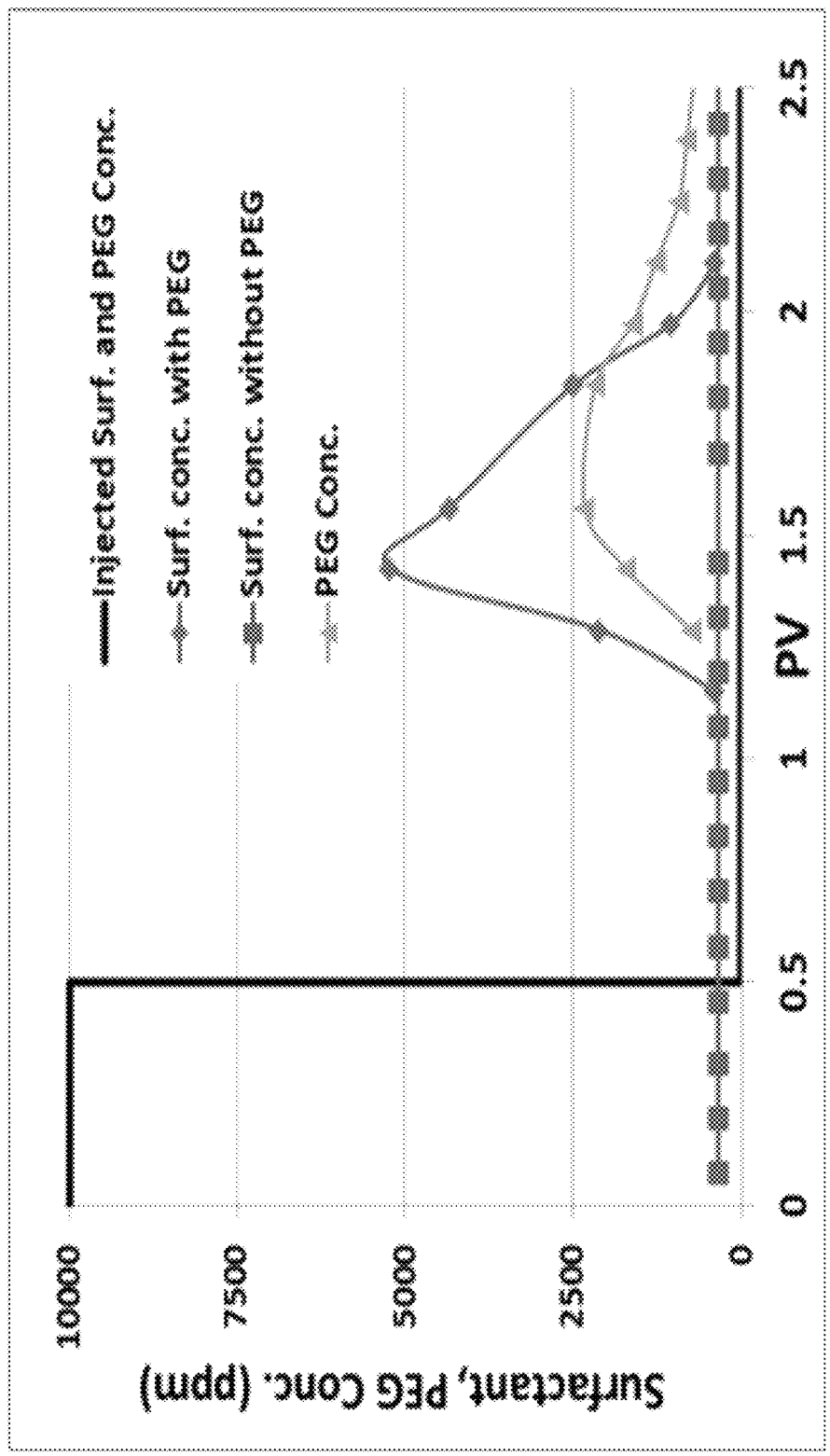
FIG. 2 plots the results of a dynamic surfactant adsorption test performed with the Illinois Basin blend in a Berea core with and without PEG 1500 as a sacrificial agent.

FIG. 2 plots the results of a dynamic surfactant adsorption test performed with the Illinois Basin blend in a Berea core with and without PEG 1500 as a sacrificial agent. The plot shows that without PEG 1500, the surfactant is strongly adsorbed by the formation, as the measured concentration of surfactant in the effluent is very low. In contrast, when PEG is present, the concentration of surfactant in the effluent peaks at 5000 ppm and is maintained at an increased concentration through PV=2.

Figure 3:
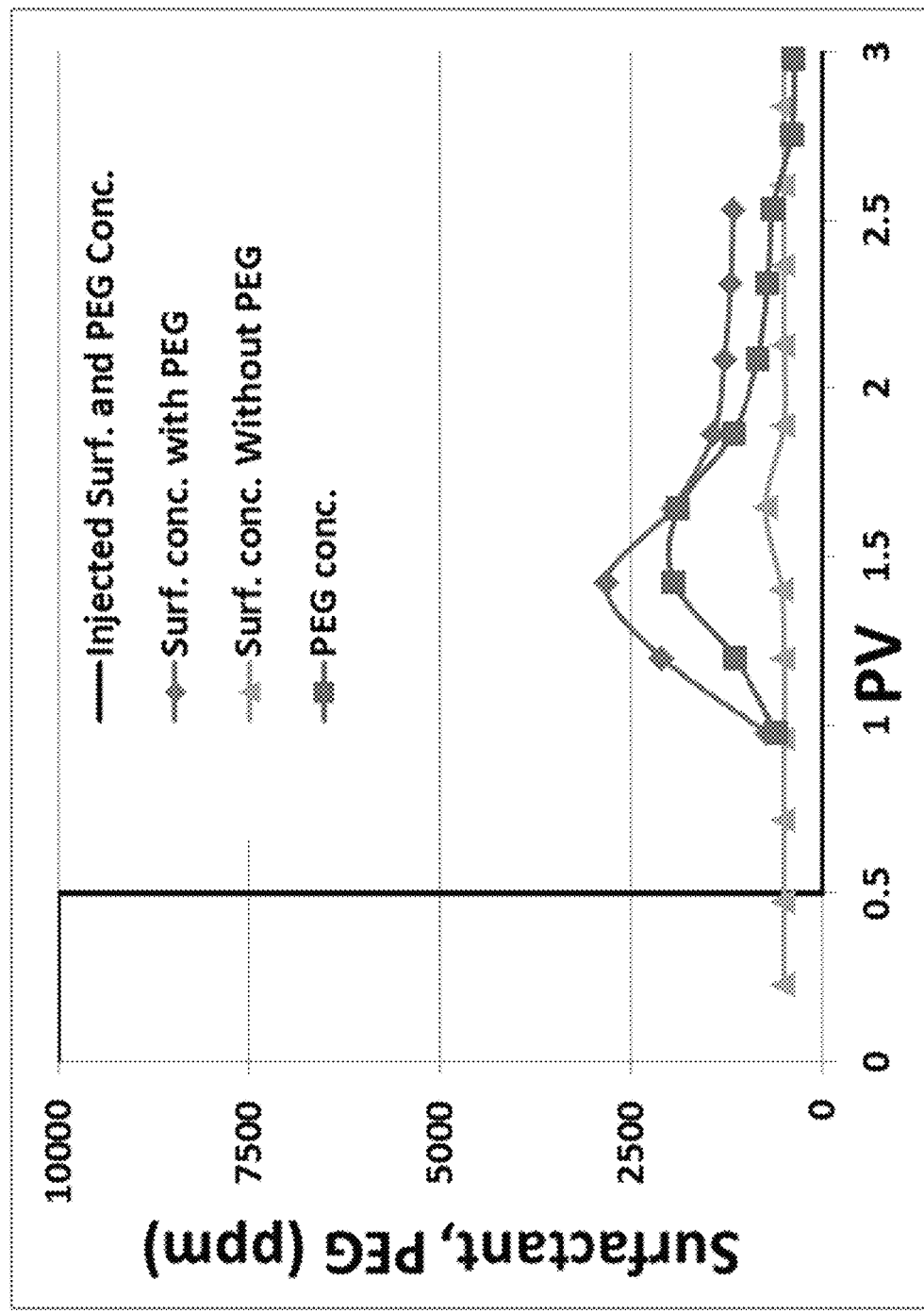
FIG. 3 plots the results of a dynamic surfactant adsorption test performed with the Illinois Basin blend in the reservoir core with and without PEG 1500 as a sacrificial agent.

FIG. 3 plots the results of a dynamic surfactant adsorption test performed with the Illinois Basin blend in the reservoir core with and without PEG 1500 as a sacrificial agent. This plot also shows that without PEG 1500, the surfactant is strongly adsorbed by the formation, as the measured concentration of surfactant in the effluent tops out well below 1000 ppm. In contrast, when PEG is present, the concentration of surfactant in the effluent peaks at about 3000 ppm and is maintained at an increased concentration through PV=2.5

Coreflood Experiments and Design of an ASP Process for the Field

A successful design of the ASP process has three main objectives. First, the surfactant slug needs to pass through the reservoir at near optimal conditions to ensure ultra-low IFT between aqueous and oil phase. Second, the IFT must be maintained low enough towards the end of the slug such that the mobilized oil is not re-trapped when the surfactant experiences dispersion, change in optimal salinity, and adsorption to the rock. Third, good mobility control needs to be ensured such that the injected fluids do not finger through the oil bank.

Figure 4:
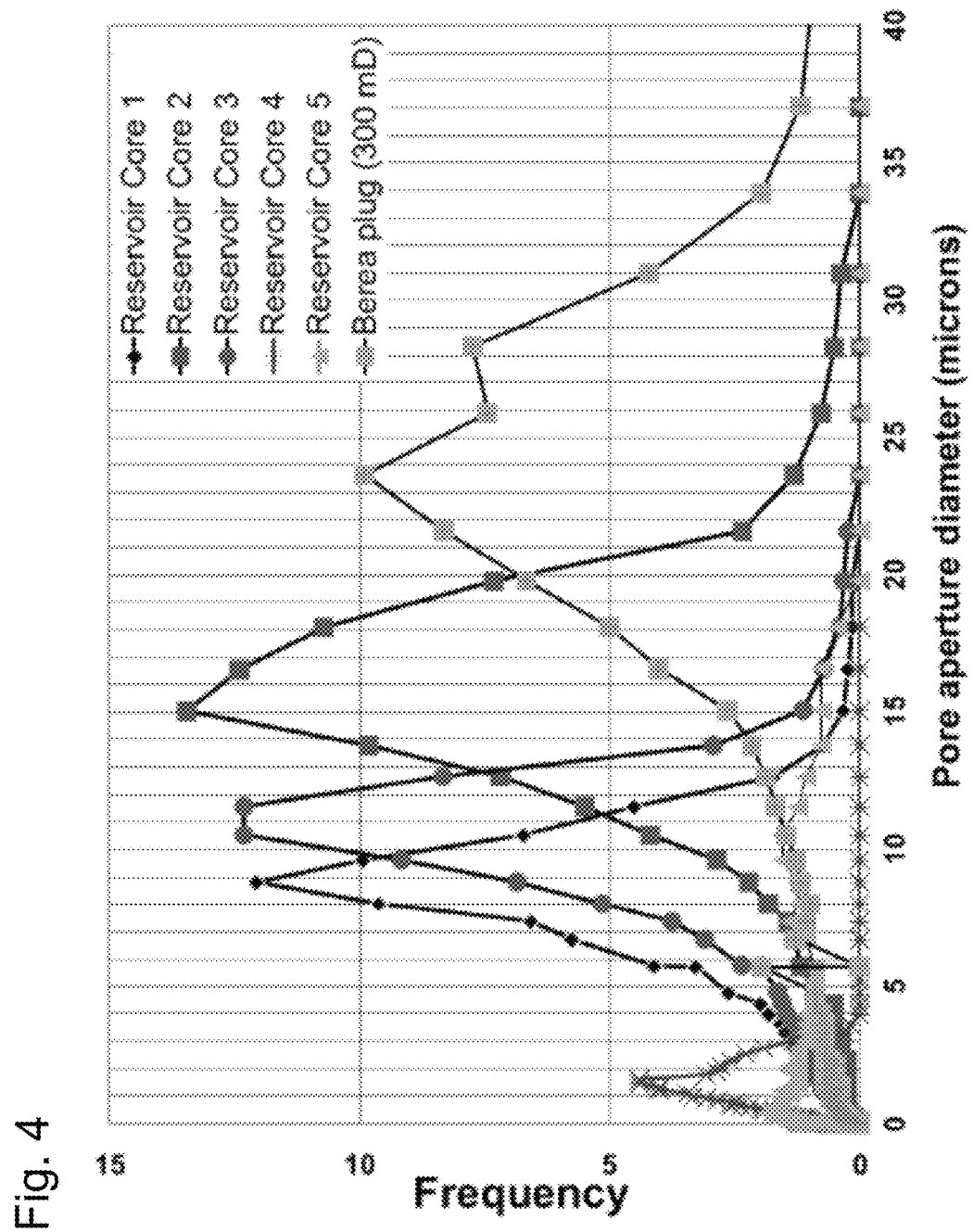
FIG. 4 plots pore size distribution of several reservoir coreplugs obtained from mercury porosimetry measurements along with the pore size distribution of a Berea core of 300 mD permeability.

As shown in FIG. 4, the typical pore body size obtained from the mercury porosimetry is between 10-15 micrometers. The typical pore size for a 300 mD Berea core is about 24 microns. It is assumed that the typical pore length scale varies with square root of the permeability. Hence, to match the typical pore size of the outcrop core with that of the reservoir core, a low permeability Berea core (65 mD) is used in the first coreflood. Although the high permeability (>300 mD) Berea core is considered homogeneous and free of clay minerals, low permeability Berea core can contain up to 10 wt. % of kaolinite/illite. Hence, low permeability Berea core is a good analog of the reservoir core to evaluate the ASP formulation in a coreflood.

Outcrop Berea Coreflood Procedure:

1) The Berea core is saturated with produced field water using vacuum saturation, and the porosity and pore volume of the core are calculated.

2) The coreflooding apparatus is maintained at reservoir temperature. Several pore volumes of produced field water are injected. Pressure drop baseline is established. Permeability of the whole core and that of the individual sections are measured by varying the flowrates.

3) Several pore volumes of the reservoir crude oil are injected into the core until the water cut is below 0.5%.

4) The core is aged at reservoir temperature for about two weeks.

5) The aged crude oil is flushed with 2 PV of fresh reservoir oil.

6) The waterflood is performed with field produced water at a displacement rate of 2 ft/day for 4 pore volumes.

7) A 0.25 pore volume of the preflush solution is injected at 2 ft/day.

8) A 0.3 pore volume of the ASP slug is injected at 2 ft/day.

9) A 0.7 pore volume of the polymer drive is injected at 2 ft/day.

10) Two pore volumes of the field produced brine are injected at 2 ft/day.

The composition of various slugs injected during the coreflood is as follows: Pre-flush: 2.5 wt. % NaCl plus 1.0 wt. % sacrificial agent; slug size: 0.25 PV. ASP drive: 1.75 wt. % $Na_2CO_3$+0.9 wt. % NaCl; 0.5 wt. % sacrificial agent; 1.0 wt. % surfactant; 0.21 wt. % partially hydrolyzed polyacrylamide; slug size: 0.3 PV. Polymer drive: 1.9 wt. % NaCl, 0.20 wt. % partially hydrolyzed polyacrylamide; slug size: 0.7 PV.

The pressure drop data is recorded for the whole core as well as that for the five sections during the coreflood. An automated fraction collector is used to collect effluent samples. Surfactant concentration in the effluent samples is measured using high performance liquid chromatography (HPLC) using surfactant plus LC column.

At the end of the oil injection step, the oil saturation (So) is calculated to be 0.65. During the waterflood stage, the maximum recorded pressure drop is 26 psi. The waterflood recovery is calculated to be 37% of the original oil in place (OOIP). The residual oil saturation (Sor) is 0.42.

Figure 5:
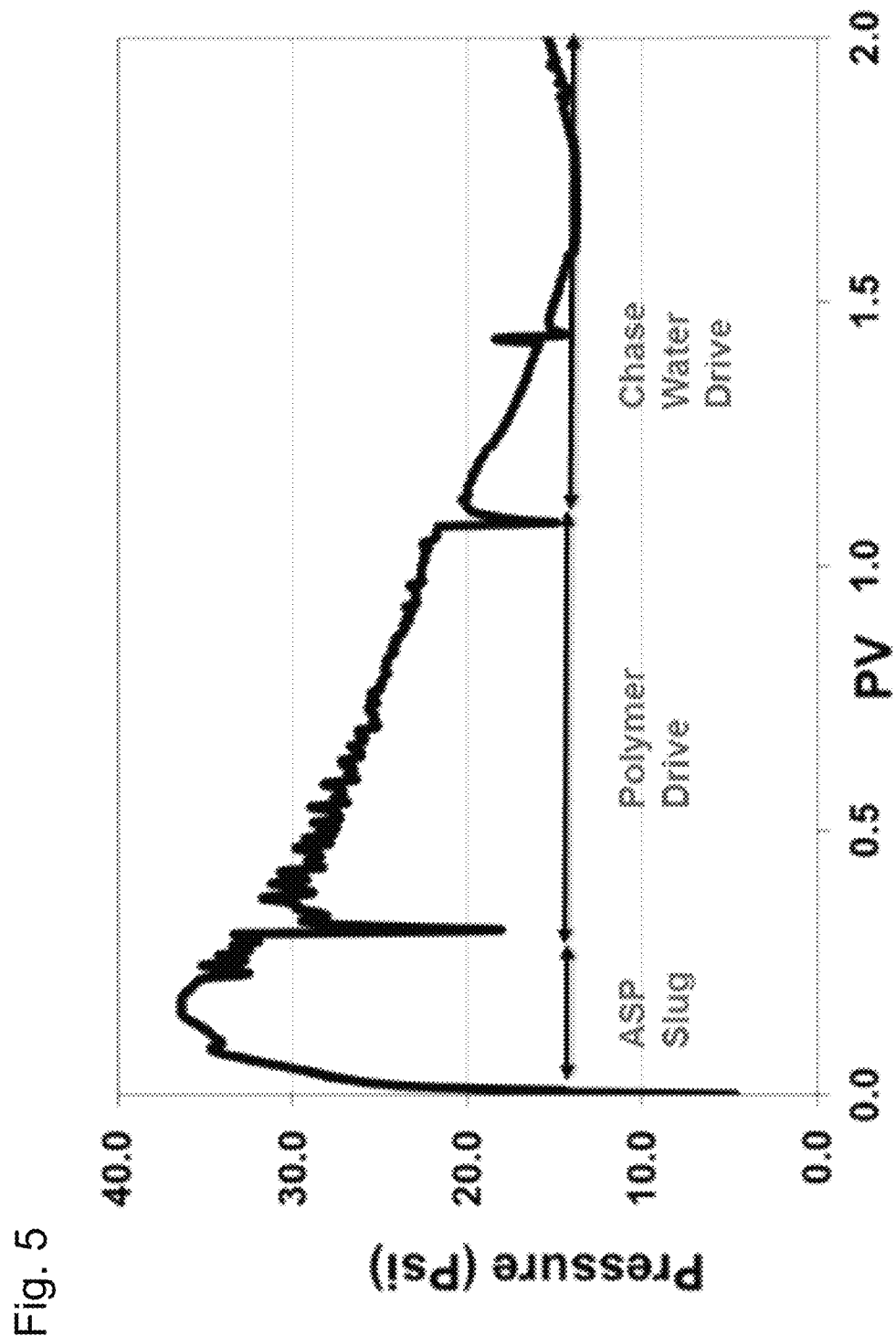
FIG. 5 plots total pressure drop across the core for an ASP coreflood using 65 mD Berea core.

FIG. 5 shows the pressure drop recorded during the chemical injection using low permeability (65 mD) Berea core sample. Pressure drop at the end of waterflood is about 26 psi. During the ASP slug injection, pressure drop steadily increases to about 37 psi, and the peak in pressure drop response is followed by the breakthrough of the oil bank as shown in FIG. 5. For the duration of 0.25 PV to 1 PV, residual oil is produced at high oil cut (between 30-45% oil cut). Oil recovery slows significantly after 1 pore volume of injection. This suggests that the coreflood experiment ran with good mobility control.

Figure 6:
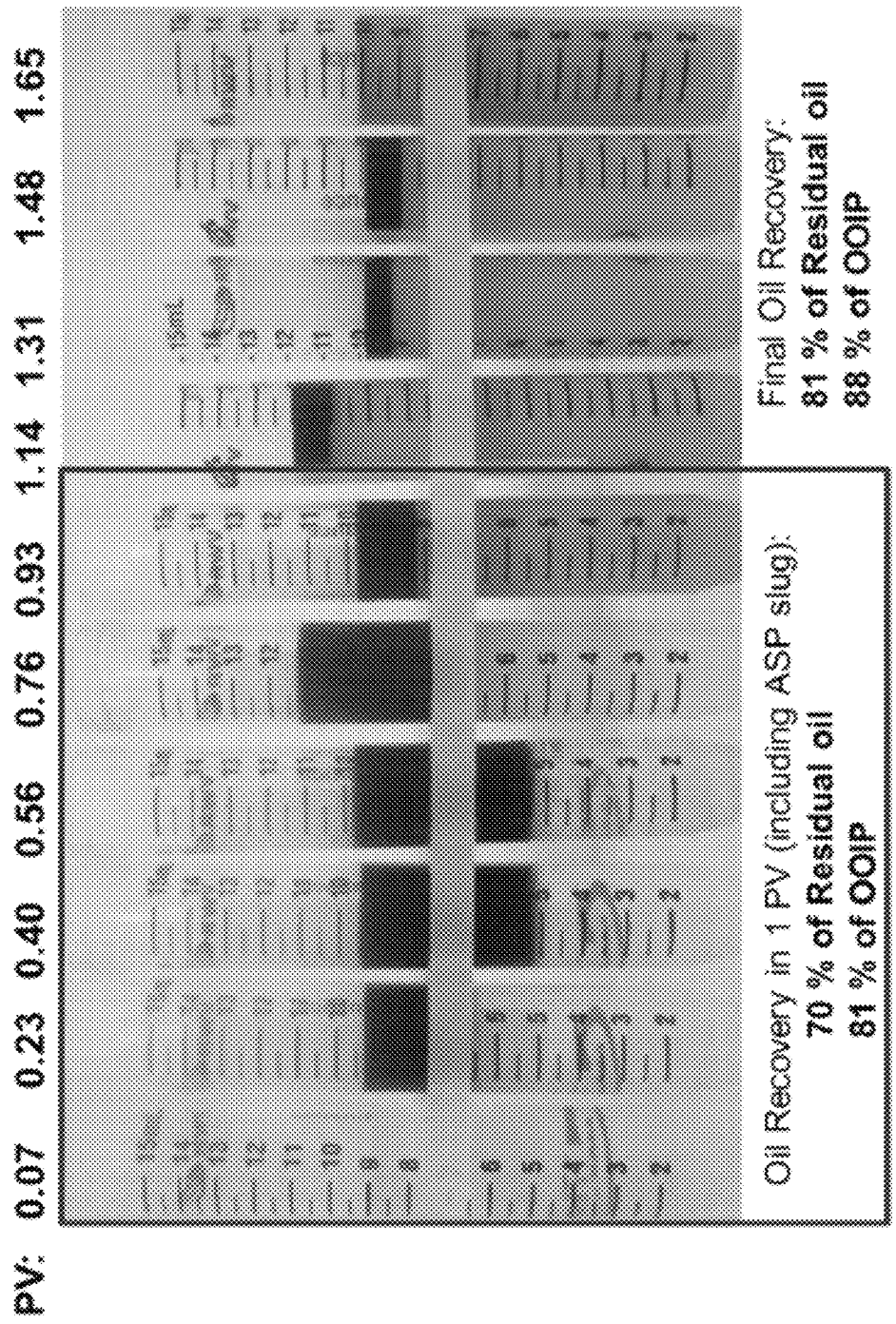
FIG. 6 shows photos of effluent samples collected as a function of pore volume during the chemical injection into the Berea core.
Figure 7:
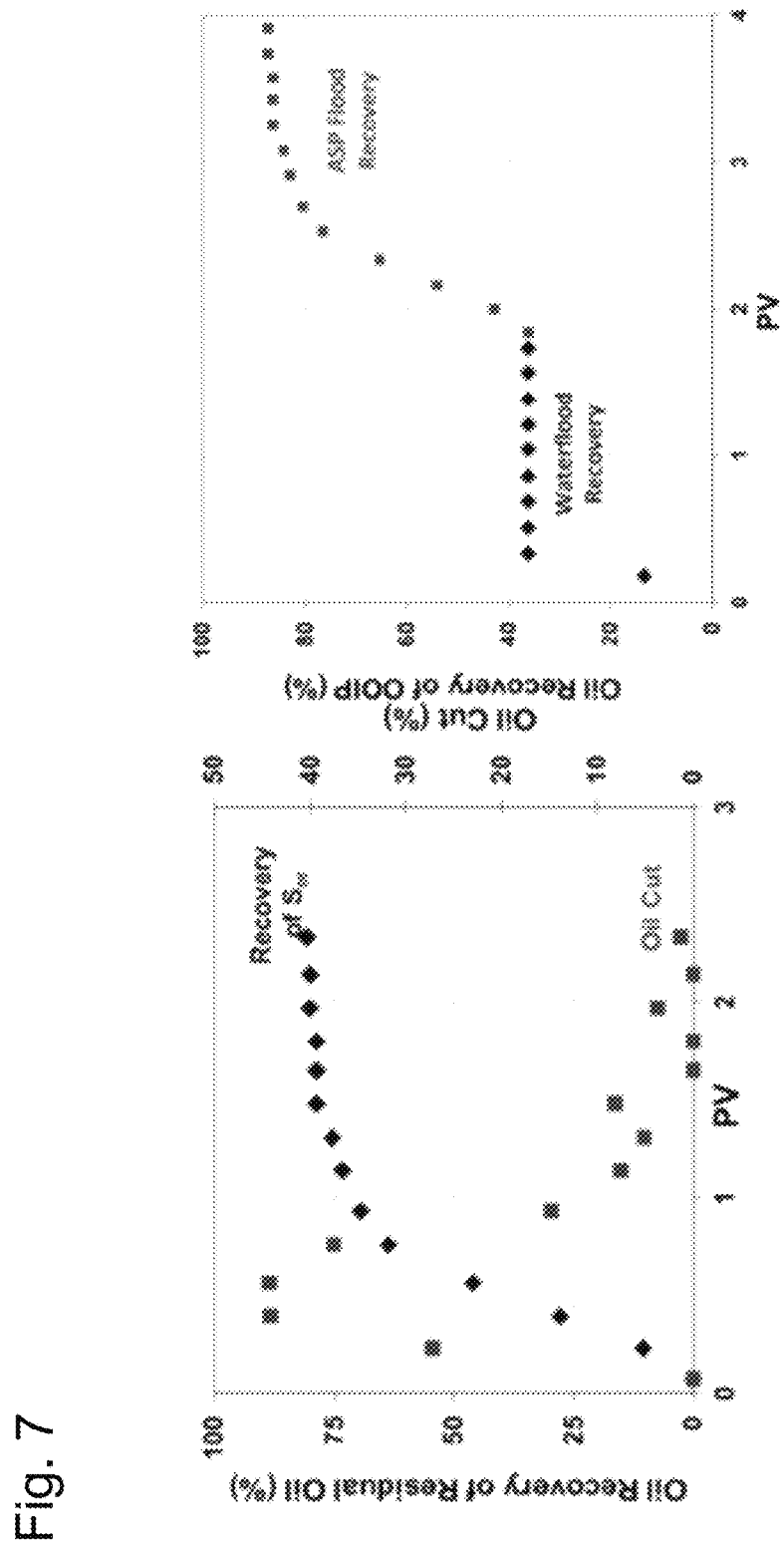
FIG. 7 shows plots of (a) oil recovery of residual oil (%) versus pore volume during chemical injection and (b) oil cut (%) or oil recovery of OOIP (%) as a function of pore volume.

FIG. 6 shows the effluent samples collected during the chemical injection. The oil and aqueous phase separate rapidly without centrifugation. No emulsion is produced during the coreflood. FIG. 7 shows that the majority of the oil recovery takes place during the first pore volume of the chemical injection. During the first pore volume of chemical injection, about 70% of the residual oil is produced. Final oil recovery (after 2 pore volumes) is 81% of the residual oil. After completion of the coreflood, the Berea core shows no noticeable streaks of unswept oil.

Cleaning of the Reservoir Coreplugs for Restored Core Analysis:

Use of outcrop cores such as Berea does not require cleaning of the core sample. However, while using reservoir rock cores it is important to restore the coreplugs to current reservoir conditions prior to chemical injection. Restored state analysis requires that the core be cleaned to the water-wet state that existed before oil accumulated in the formation. The core is then saturated with crude oil to a capillary pressure typical of the formation and the system allowed to equilibrate or "age" at reservoir temperature.

A refluxing solution of one solvent or an azeotropic mixture of multiple solvents (toluene, toluene/methanol, chloroform/methanol, etc.) is often used to clean cores of residual oil. In solvent cleaning using a Soxhlet-type apparatus, it has been assumed that the application of heat, diffusion of solvent and enough cleaning time would ultimately dissolve residual oil from all of the pore space in the core. However, we found that for low permeability (<30 md) coreplugs, such cleaning method is inadequate even after a week. Flow-through cleaning using a variety of solvents is more effective in removing residual oil and returning the coreplugs to a water-wet state.

We collected effluents during the flow-through cleaning using various solvents. The effluents appear clear of any oil after injecting about 10 pore volumes of toluene. However, switching to tetrahydrofuran (THF) results in a dark black effluent. This confirms that cleaning of cores using toluene alone is insufficient. After cleaning with THF, chloroform is used to displace THF from the core. Methanol is then used to displace chloroform from the core. Finally, air (at 135 psi) is injected to evaporate methanol from the core. The dried core samples are kept under vacuum to remove any residual methanol from the core sample. The dry weight, length, and diameter of each coreplug are then recorded. The coreflood procedure is the same as outlined previously.

The permeability of the composite core is calculated to be 20 mD during the brine saturation. Because of low permeability of the core, it was decided to use the lower concentration of lower molecular weight polymer to prevent plugging. The viscosities of the ASP slug and the polymer drive were 10 cP each. Viscosity of the ASP slug and polymer drive may not be sufficient to main good mobility control during the coreflood. However, since they are greater than the viscosity of the crude oil, we did not expect significant fingering through the core during chemical injection.

The composition of the various slugs injected in the core during the coreflood are as follows: Pre-flush: 2.5 wt. % NaCl; 1.0 wt. % sacrificial agent; slug size: 0.25 PV. ASP drive: 1.75 wt. % $Na_2CO_3$+0.9 wt. % NaCl; 0.5 wt. % sacrificial agent; 1.0 wt. % surfactant; 0.16 wt. % partially hydrolyzed polyacrylamide; slug size: 0.3 PV. Polymer drive: 1.9 wt. % NaCl; 0.16 wt. % partially hydrolyzed polyacrylamide; slug size: 0.7 PV.

At the end of the oil injection step, the oil saturation (So) is calculated to be 0.61. During the waterflood stage, the maximum recorded pressure drop is 34 psi. The waterflood recovery is calculated to be 29% of the original oil in place (OOIP). This low waterflood recovery is consistent with the waterflood recovery observed in the field. At the end of waterflood, the residual oil saturation (Sor) is 0.44.

Figure 8:
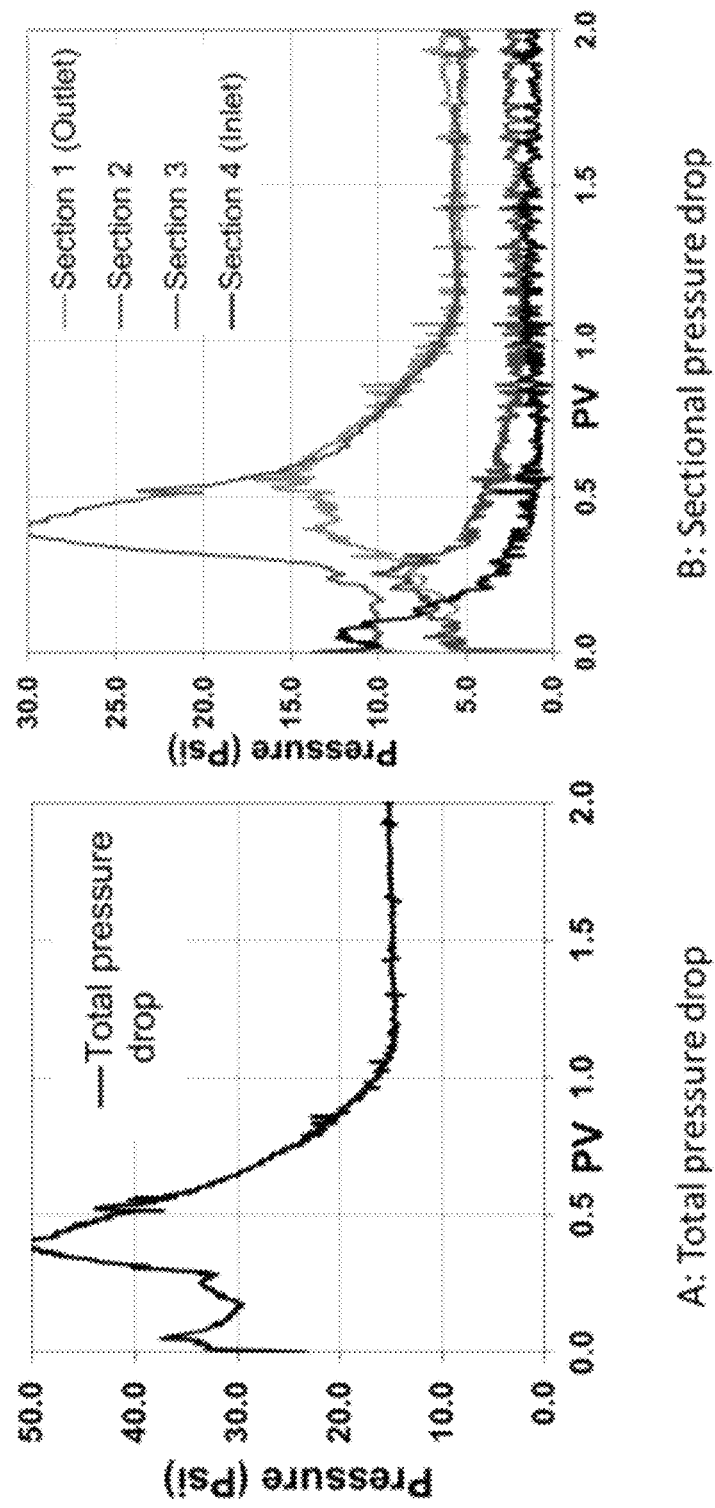
FIG. 8 plots pressure versus pore volume to show the (a) total pressure drop response or (b) sectional pressure drop response of a reservoir rock composite core during chemical injection.
Figure 9:
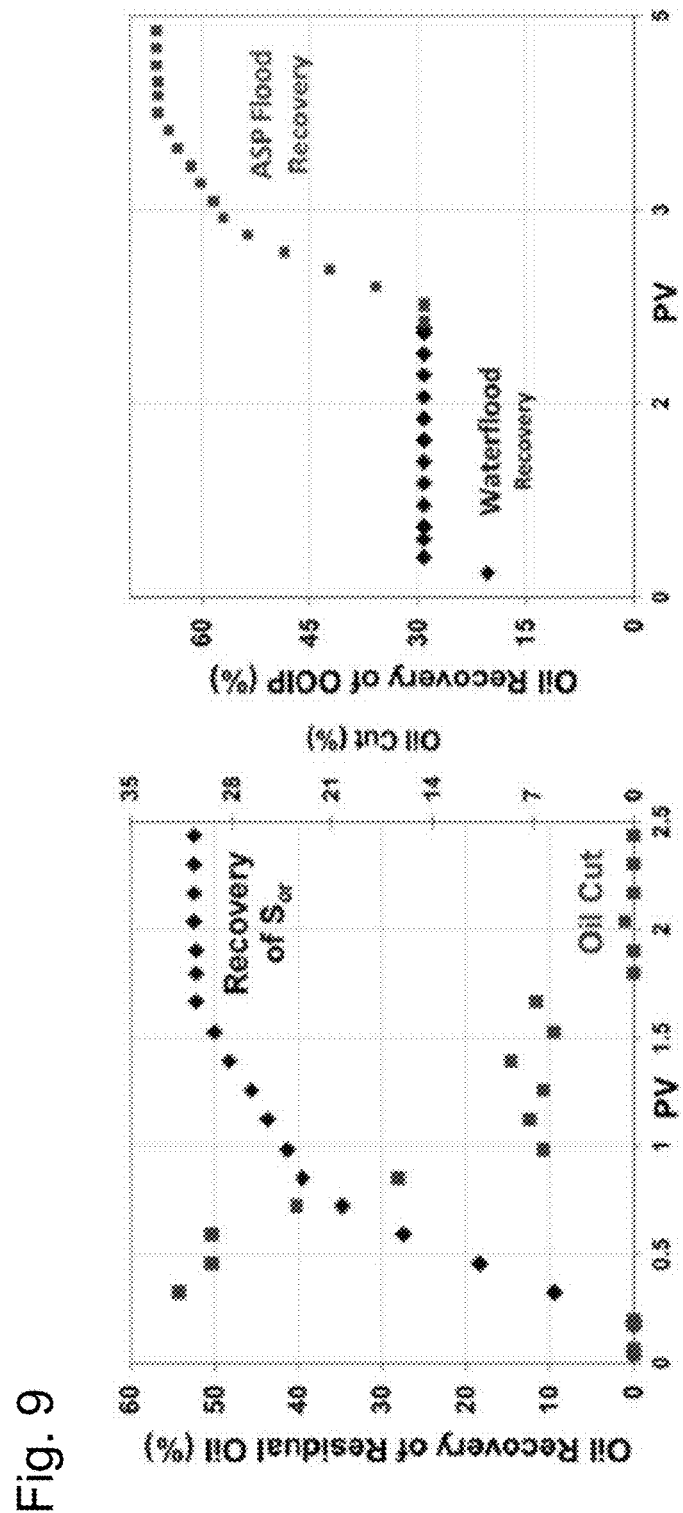
FIG. 9 plots (a) oil recovery of residual oil (%) or oil cut (%) versus pore volume; and (b) oil recovery of OOIP (%) versus pore volume during a coreflood.
Figure 10:
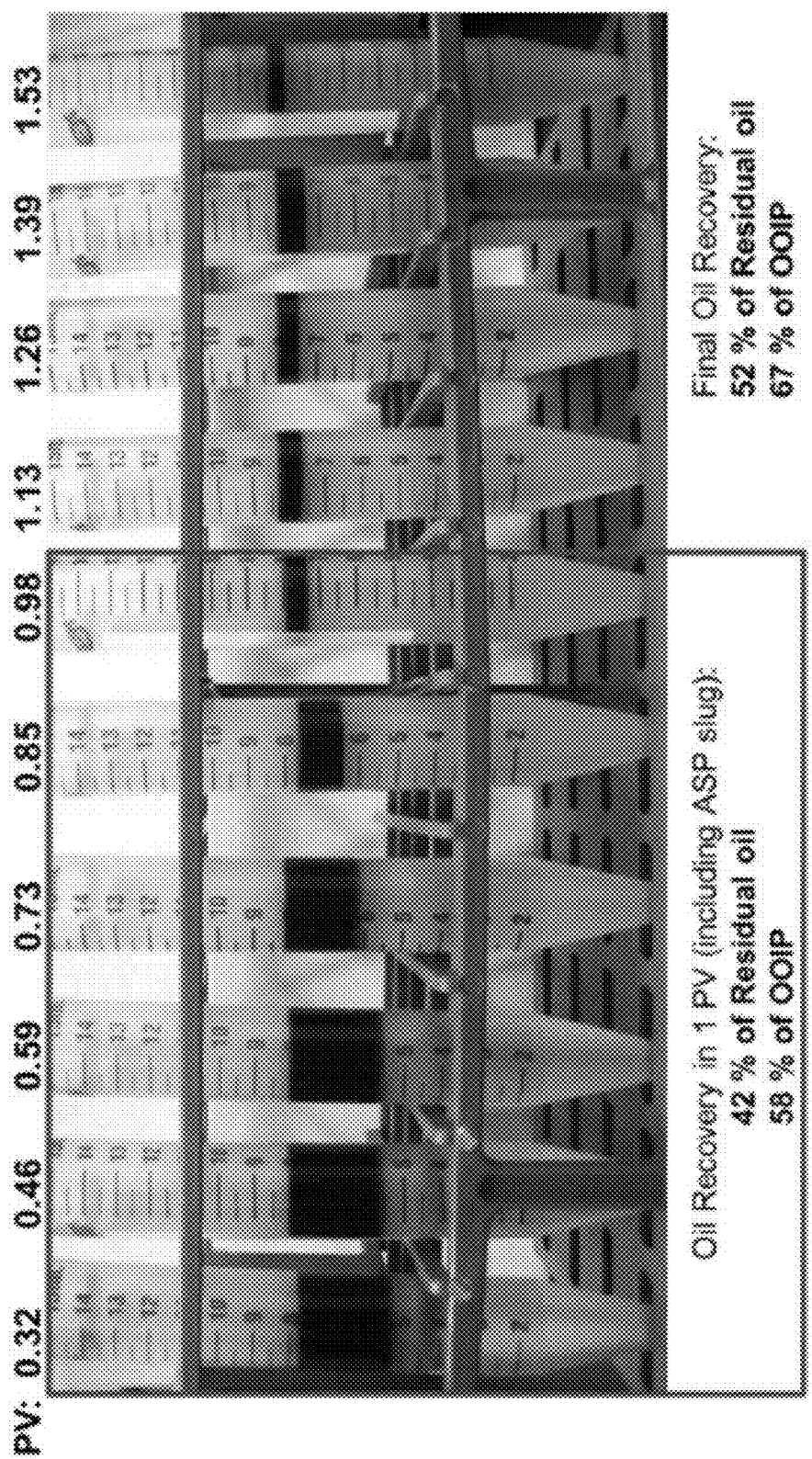
FIG. 10 is a photo showing effluents collected during chemical injection into reservoir cores as a function of pore volume.
Figure 11:
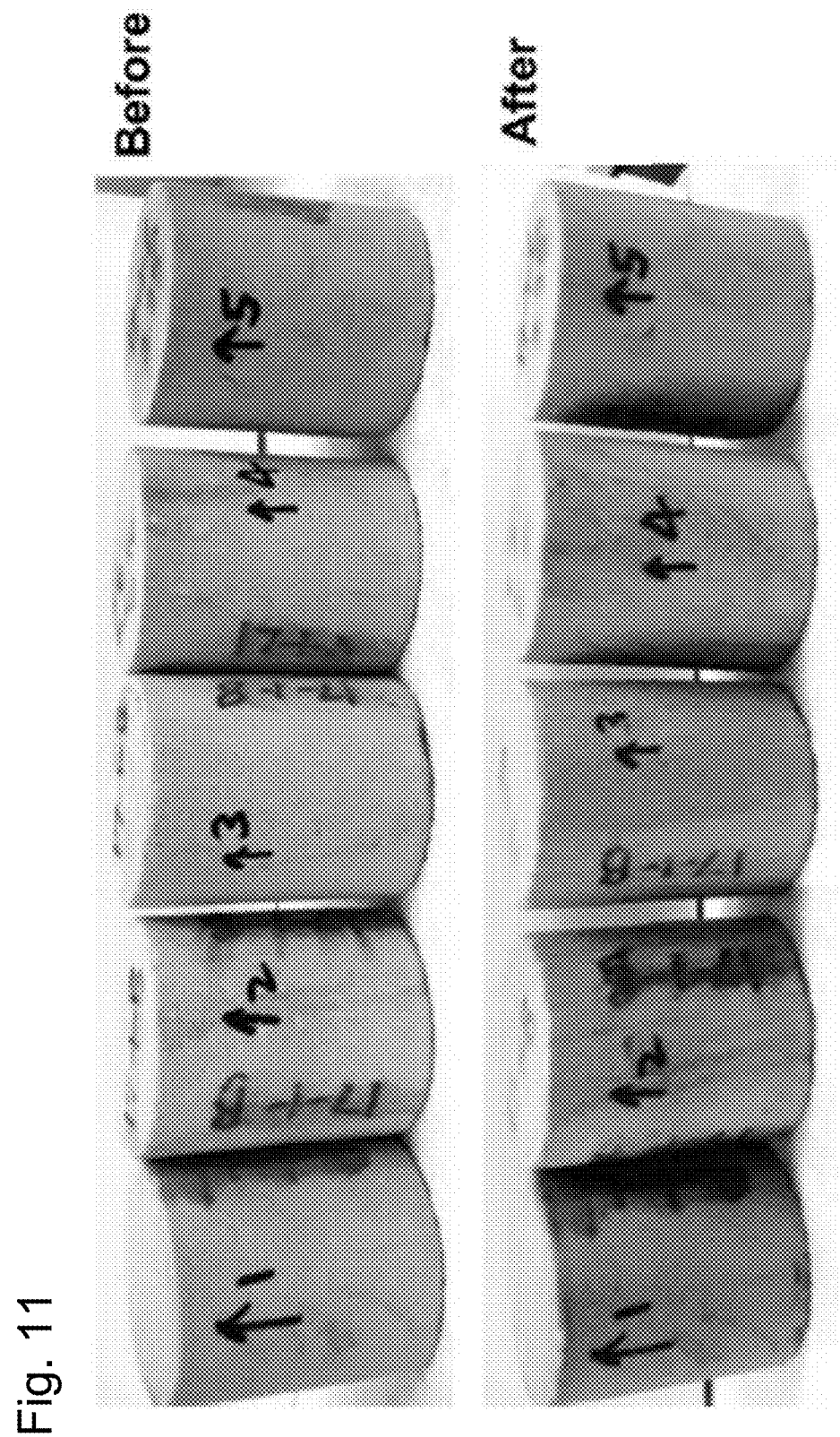
FIG. 11 is a photo showing reservoir coreplugs before and after completion of a coreflood.
Figure 12:
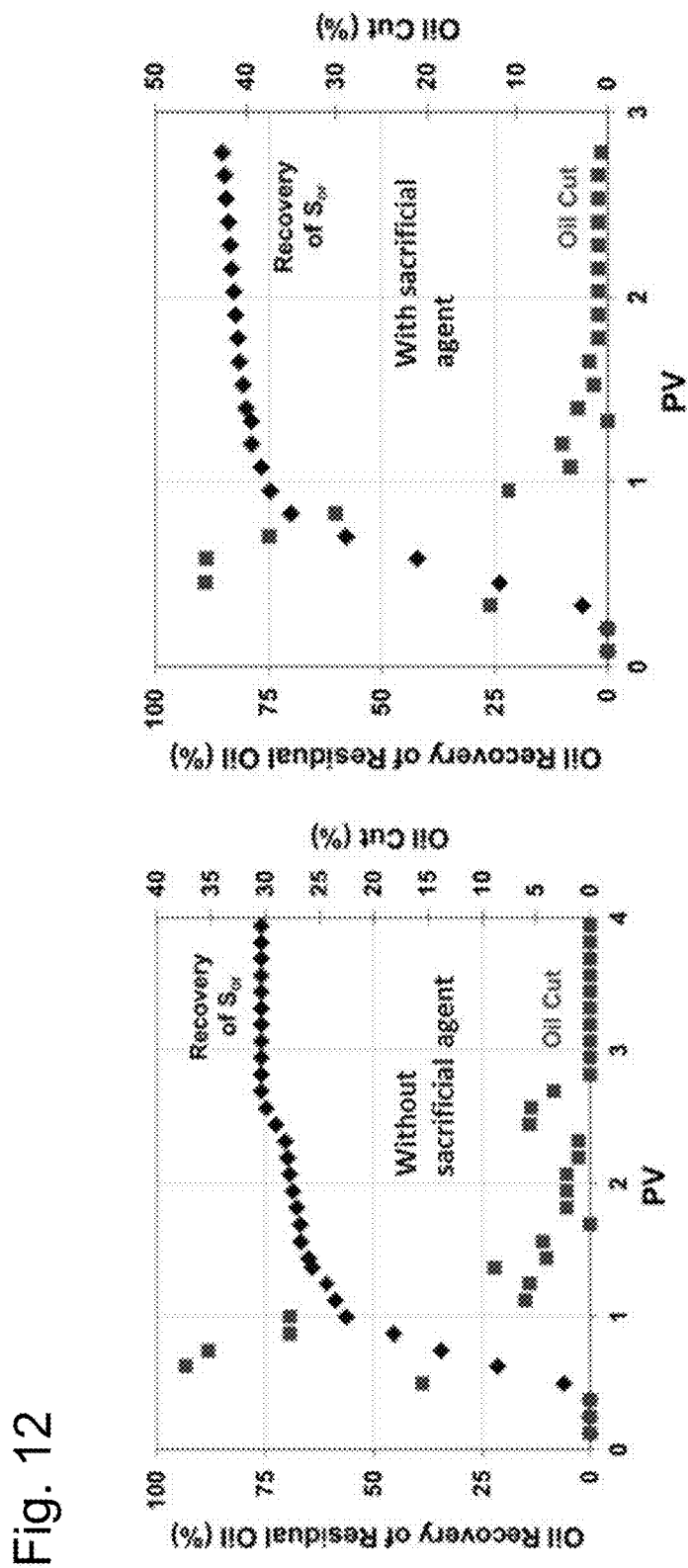
FIG. 12 plots oil recovery of residual oil from two Berea corefloods for Illinois Basin sands with or without PEG 1500 as the sacrificial agent.

FIG. 8 shows the pressure drop recorded during the chemical injection for the composite core sample. Pressure drop at the end of waterflood is about 34 psi. During the ASP slug injection, pressure drop steadily increases to about 50 psi. The peak in pressure response corresponds to the breakthrough of the oil bank as shown in FIG. 9. For the duration of 0.25 PV to 1 PV, residual oil is produced at high oil cut (between 22-30% oil cut). Unlike the coreflood using the Berea core, the oil recovery for the composite core did not slow down after 1 pore volume of injection. This suggests that the coreflood experiment ran without adequate mobility control and some fingering occurred during displacement. FIG. 9 shows that during the first pore volume of chemical injection, about 42% of the residual oil is produced. Final oil recovery (after 2 pore volumes) is 52% of the residual oil. FIG. 10 shows the effluent samples collected during the chemical injection. FIG. 11 shows before and after chemical flood pictures of the coreplugs used in the coreflood.

Single Well Chemical Tracer Test (SWCTT):

To further test the developed surfactant formulation under field conditions, a third party was hired to perform a single well chemical tracer test (SWCTT) at one of the wells in the reservoir. Details of SWCTT have been published. However, the main idea of single well tracer test is discussed briefly herein for completeness. In a SWCTT, the same well is used as injection and production well at different stages of the test.

1. Excess produced water is injected into the well and is produced back to ensure no free oil is being produced.
2. Chemical tracers are injected into the well and the well is shut in for a period of time.
3. Tracers are produced back and based on the separation of the tracers due to partitioning between the aqueous and the oil phases, the oil saturation is calculated.
4. After the initial oil saturation is measured, ASP chemicals are injected into the well and are chased by excess produced water to push mobilized oil away from the well.
5. Chemical tracer test is repeated to measure the post-ASP oil saturation.
6. The difference between initial and final oil saturation characterizes the effectiveness of the surfactant formulation.

Tables 11 and 12 show the calculated oil saturation before and after the injection of ASP chemicals. The average oil saturation prior to ASP injection is about 0.32. After ASP injection, the average oil saturation is reduced to 0.10. This shows that in a single well test, ASP chemicals mobilize about 69% of the residual oil, making it a successful ASP flood. Further inspection of the SWCT test data suggests that ASP fluid is unable to contact Layer 1 effectively, which could be due to inaccessible pore volume for the ASP/polymer drive. This suggests the desirability of further analysis to find the suitable molecular weight of polymer which can assist in maximizing the accessible pore space to ASP/polymer drive.

TABLE 11

Oil saturation of the three layers detected as part of pore space before ASP injection

| Layer | Fraction of SWCTT Fluid Entering Layer | Layer Sor |
|---|---|---|
| 1 | 0.16 | 0.34 |
| 2 | 0.64 | 0.37 |
| 3 | 0.20 | 0.15 |
| total | 1.00 | 0.32 |

TABLE 12

Oil saturation of the three layers detected as part of pore space after ASP injection

| Layer | Fraction of SWCTT Fluid Entering Layer | Layer Sor |
|---|---|---|
| 1 | 0.15 | 0.33 |
| 2 | 0.65 | 0.07 |
| 3 | 0.20 | 0.03 |
| total | 1.00 | 0.10 |

Part 3. Effect of PEG as Sacrificial Agent on Coreflood Recoveries Using Berea Core with Illinois Basin Formulation/Oil Table 13 shows that the use of PEG as a sacrificial agent allows a higher oil recovery from crushed Illinois Basin sand at high brine strength.

TABLE 13

Comparison of Berea Corefloods for Illinois Basin With and Without PEG as a Sacrificial Agent

| S. No. | Sacrificial agent used | SP slug size (PV) | Recovery of residual oil (%) | Recovery of OOIP (%) |
|---|---|---|---|---|
| 1 | None | 0.4 | 76 | 89 |
| 2 | PEG 1500 | 0.3 | 85 | 93 |

The preceding examples are meant only as illustrations; the following claims define the invention.

I claim:

1. An enhanced oil recovery method which comprises:
   (a) into an oil-bearing sandstone formation having a clay content of at least 5 wt. %, injecting a surfactant mixture, a solution comprising 0.5 to 3 wt. % aqueous alkali, an aqueous solution comprising a polyether, and optionally a hydrophilic polymer, wherein the polyether solution is injected as a sacrificial agent prior to injection of the surfactant mixture or is injected as a mitigation agent concurrently with the surfactant mixture; and
   (b) recovering oil from the formation;
   wherein the surfactant mixture comprises a $C_{20}$-$C_{24}$ internal olefin sulfonate and an alcohol propoxy sulfate; and
   wherein adsorption of the surfactant mixture onto the formation is reduced by at least 20% compared with a similar method performed without the aqueous alkali solution, the polyether solution, or both.

2. The method of claim 1 wherein the formation has a clay content within the range of 10 to 50 wt. %.

3. The method of claim 1 wherein the solution comprising aqueous alkali comprises an alkali metal hydroxide, an alkali metal carbonate, an alkali metal bicarbonate, an alkali metal borate, or a mixture thereof.

4. The method of claim 1 wherein the solution comprising aqueous alkali comprises 1.5 to 2.5 wt. % of sodium carbonate or sodium hydroxide.

5. The method of claim 1 wherein the aqueous solution comprising a polyether is injected as a sacrificial agent prior to injection of the surfactant mixture.

6. The method of claim 1 wherein the aqueous solution comprising a polyether is injected concurrently with the surfactant mixture as a mitigation agent.

7. The method of claim 1 wherein the aqueous solution comprising a polyether comprises a polyether selected from the group consisting of polyethylene glycols having number average molecular weights from 200 to 2,500, polypropylene glycols having number average molecular weights from 200 to 1,000, block copolymers of ethylene oxide and propylene oxide having number average molecular weights from 200 to 2,500, and random copolymers of ethylene oxide and propylene oxide having number average molecular weights from 200 to 2,500.

8. The method of claim 1 wherein adsorption of the surfactant mixture onto the formation is reduced by at least 20% compared with a similar method performed without the aqueous alkali solution.

9. The method of claim 1 wherein adsorption of the surfactant mixture onto the formation is reduced by at least 30% compared with a similar method performed without the aqueous alkali solution, the polyether solution, or both.

10. The method of claim 1 wherein adsorption of the surfactant mixture onto the formation is reduced by at least 50% compared with a similar method performed without the aqueous alkali solution, the polyether solution, or both.

11. An enhanced oil recovery method which comprises:
(a) into an oil-bearing sandstone formation having a salinity within the range of 20,000 to 100,000 ppm total dissolved solids and a divalent ion content within the range of 1,000 to 10,000 ppm, injecting a surfactant mixture, an aqueous solution comprising a polyether, and optionally a hydrophilic polymer, wherein the polyether solution is injected as a sacrificial agent prior to injection of the surfactant mixture or is injected as a mitigation agent concurrently with the surfactant mixture; and
(b) recovering oil from the formation;
wherein the surfactant mixture comprises a $C_{20}$-$C_{24}$ internal olefin sulfonate and an alcohol propoxy sulfate; and
wherein adsorption of the surfactant mixture onto the formation is reduced by at least 20% compared with a similar method performed without the polyether solution.

12. The method of claim 11 wherein the formation has a clay content less than 5 wt. %.

13. The method of claim 11 wherein the formation has a salinity within the range of 50,000 to 100,000 ppm total dissolved solids.

14. The method of claim 11 wherein the formation has a divalent ion content within the range of 1,500 to 5,000 ppm.

15. The method of claim 11 wherein the aqueous solution comprising a polyether is injected as a sacrificial agent prior to injection of the surfactant mixture.

16. The method of claim 11 wherein the aqueous solution comprising a polyether is injected concurrently with the surfactant mixture as a mitigation agent.

17. The method of claim 11 wherein the aqueous solution comprising a polyether comprises a polyether selected from the group consisting of polyethylene glycols having number average molecular weights from 200 to 2,500, polypropylene glycols having number average molecular weights from 200 to 1,000, block copolymers of ethylene oxide and propylene oxide having number average molecular weights from 200 to 2,500, and random copolymers of ethylene oxide and propylene oxide having number average molecular weights from 200 to 2,500.

18. The method of claim 11 wherein adsorption of the surfactant mixture onto the formation is reduced by at least 30% compared with a similar method performed without the polyether solution.

19. The method of claim 11 wherein adsorption of the surfactant mixture onto the formation is reduced by at least 50% compared with a similar method performed without the polyether solution.

20. An enhanced oil recovery method which comprises:
(a) pre-flushing an oil-bearing sandstone formation having a clay content of at least 5 wt. % with a sacrificial agent comprising an aqueous solution comprising a polyether;
(b) injecting a solution comprising aqueous alkali, a surfactant mixture, and a hydrophilic polymer into the formation;
(c) injecting additional hydrophilic polymer into the formation to drive oil to a production well in the formation; and
(d) recovering oil from the production well;
wherein the surfactant mixture comprises a $C_{20}$-$C_{24}$ internal olefin sulfonate and an alcohol propoxy sulfate; and
wherein adsorption of the surfactant mixture onto the formation is reduced by at least 20% compared with a similar method performed without the aqueous alkali solution, the polyether solution, or both.

21. The method of claim 20 wherein adsorption of the surfactant mixture onto the formation is reduced by at least 20% compared with a similar method performed without the aqueous alkali solution.

* * * * *